(12) United States Patent
Nomoto

(10) Patent No.: US 9,189,701 B2
(45) Date of Patent: Nov. 17, 2015

(54) OBJECT DETECTION APPARATUS, OBJECT DETECTION METHOD, STORAGE MEDIUM, AND INTEGRATED CIRCUIT

(71) Applicant: MegaChips Corporation, Osaka-shi (JP)

(72) Inventor: Shohei Nomoto, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 0 days.

(21) Appl. No.: 14/157,929

(22) Filed: Jan. 17, 2014

(65) Prior Publication Data

US 2014/0226908 A1    Aug. 14, 2014

(30) Foreign Application Priority Data

Feb. 8, 2013    (JP) .................................. 2013-023077

(51) Int. Cl.
*G06K 9/46*    (2006.01)
*G06K 9/00*    (2006.01)

(52) U.S. Cl.
CPC .......... *G06K 9/4604* (2013.01); *G06K 9/00805* (2013.01); *G06K 9/46* (2013.01)

(58) Field of Classification Search
CPC ..... G02B 7/36; H04N 5/23212; H04N 5/142; G06K 9/00805; G06K 9/4604; G06K 9/00241; G06K 9/481; G06K 9/4628; G06K 9/00268; G06K 9/00228; G06T 7/0042; G06T 7/0085; G06T 5/003; G06T 5/20; G06T 7/0059; G06T 2207/20144; G06T 7/0081; G06T 2207/20192; G06T 7/0083; A61B 8/469

USPC ......... 382/118, 128, 199, 203, 254, 260, 263, 382/266, 274, 275
See application file for complete search history.

(56) References Cited

U.S. PATENT DOCUMENTS

| | | | | |
|---|---|---|---|---|
| 5,740,274 | A * | 4/1998 | Ono et al. ..................... | 382/190 |
| 5,809,170 | A * | 9/1998 | Saito .............................. | 382/203 |
| 5,936,628 | A * | 8/1999 | Kitamura et al. ............. | 345/420 |
| 6,404,921 | B1 * | 6/2002 | Ishida ............................ | 382/197 |
| 6,567,571 | B1 * | 5/2003 | Kochi et al. ................... | 382/312 |
| 7,428,335 | B2 * | 9/2008 | Ida et al. ....................... | 382/177 |
| 8,786,718 | B2 * | 7/2014 | Sawada ...................... | 348/218.1 |

(Continued)

FOREIGN PATENT DOCUMENTS

JP    2002-288798    10/2002
JP    2008-9549    1/2008

*Primary Examiner* — Vu Le
*Assistant Examiner* — Aklilu Woldemariam
(74) *Attorney, Agent, or Firm* — Oblon, McClelland, Maier & Neustadt, L.L.P.

(57) ABSTRACT

An object detection apparatus, a program, and an integrated circuit enable the contour of an object to be detected in an appropriate manner in an image including an object and its background with almost no contrast between them in a predetermined direction of the image. A vertical direction edge extraction filter in a filtering unit extracts, from an input image, a contour component in a first direction (e.g., vertical direction) of the image. A horizontal direction continuity detection unit in the filtering unit detects, in a second direction (e.g., horizontal direction) perpendicular to the first direction, the continuity of the contour component extracted by the vertical direction edge extraction filter. An object area detection unit detects (estimates) the contour of the object in the image based on the continuity of the contour component in the second direction (e.g., horizontal direction) detected by the horizontal direction continuity detection unit.

12 Claims, 21 Drawing Sheets

(56) References Cited

U.S. PATENT DOCUMENTS

| | | |
|---|---|---|
| 2004/0179737 A1* | 9/2004 | Skourikhine et al. ......... 382/199 |
| 2006/0008151 A1* | 1/2006 | Lin et al. ....................... 382/190 |
| 2007/0084655 A1* | 4/2007 | Kakinami et al. ............. 180/167 |
| 2007/0286515 A1* | 12/2007 | Kim et al. ..................... 382/254 |
| 2007/0291999 A1* | 12/2007 | Ito et al. ........................ 382/118 |
| 2008/0036900 A1* | 2/2008 | Nakajima et al. ............. 348/345 |
| 2009/0310880 A1* | 12/2009 | Yokoyama et al. ............ 382/260 |
| 2010/0053410 A1* | 3/2010 | Yoshii et al. .............. 348/333.11 |
| 2010/0274478 A1* | 10/2010 | Takahashi ...................... 701/201 |
| 2012/0076419 A1* | 3/2012 | Kono et al. .................... 382/195 |
| 2012/0212615 A1* | 8/2012 | Ishii ............................... 348/148 |
| 2012/0281895 A1* | 11/2012 | Chono et al. .................. 382/128 |
| 2012/0314960 A1* | 12/2012 | Tay ................................ 382/199 |
| 2013/0136367 A1* | 5/2013 | Kitajima ........................ 382/199 |
| 2013/0182961 A1* | 7/2013 | Tay ................................ 382/199 |

\* cited by examiner

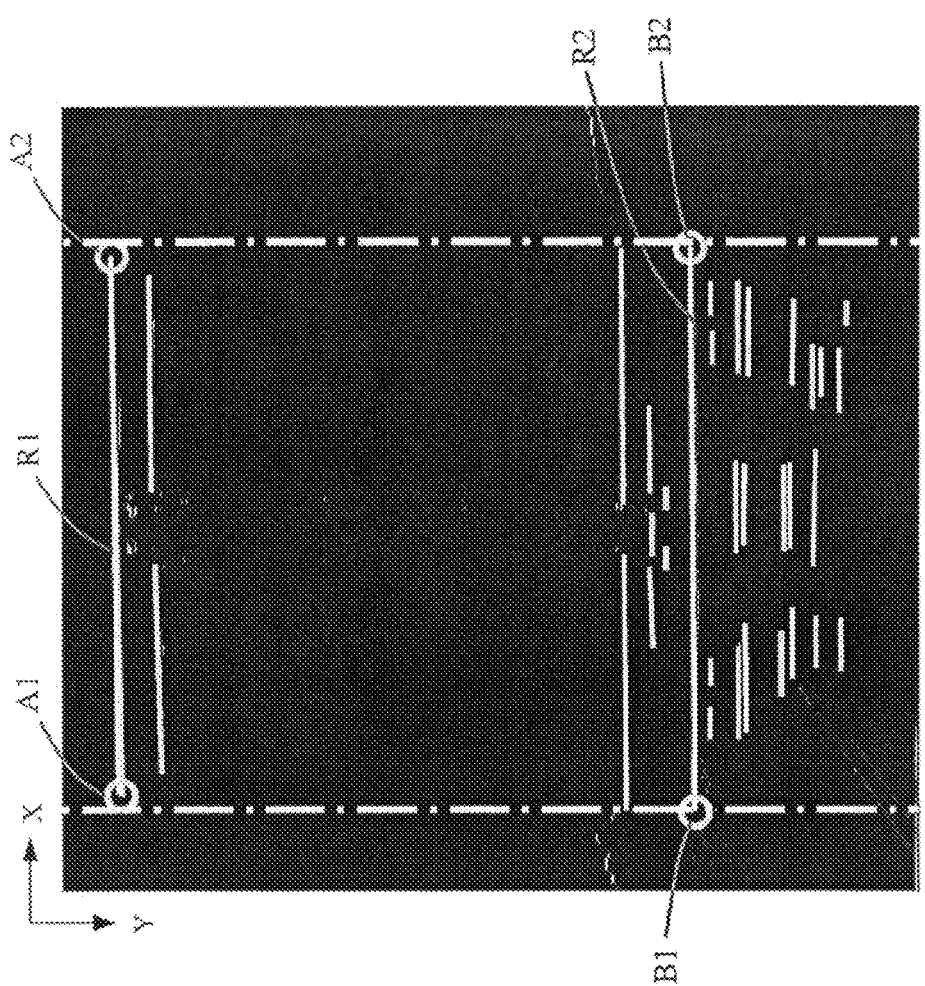

OBJECT DETECTION APPARATUS, OBJECT DETECTION METHOD, STORAGE MEDIUM, AND INTEGRATED CIRCUIT

BACKGROUND OF THE INVENTION

1. Field of the Invention

The present invention relates to a technique for processing images, and more particularly, to a technique for detecting an object in an image.

2. Description of the Background Art

Various techniques have been developed to identify an object (target) in a captured image by using an edge extraction process. For example, Japanese Unexamined Patent Publication No. 2002-288798 (hereafter referred to as "Patent Literature 1") describes a technique for identifying (extracting) a target with high accuracy in a different image with a different contrast between a target (e.g., an automobile) and its background (e.g., a parking place). With the technique described in Patent Literature 1, the image in which edges have been extracted is subjected to predetermined processing assuming the background includes more image areas with low brightness than the target. With this technique, the captured image first undergoes an edge extraction process to generate an edge extracted image. The pixel values of the edge extracted image are then divided by the brightness values of the original image to generate an image in which edges have been enhanced. Even for an image in which the contrast between a target and its background is low, such edge enhancement generates an edge enhanced image including appropriately enhanced edges when the background includes more image areas with low brightness. With the technique described in Patent Literature 1, the target is identified (extracted) from the edge enhanced image. This enables a target to be identified (extracted) with high accuracy in a different image with a different contrast between a target (e.g., an automobile) and its background (e.g., a parking space).

However, the technique in Patent Literature 1 assumes that the background includes more image areas with low brightness, and thus may fail to identify (extract) an object (target) in an appropriate manner in an image with a particular background. The technique in Patent Literature 1 may also fail to detect the contour of a target in an appropriate manner in an image in which the target and its background have almost no contrast in a predetermined direction of the image. This may disable an object (target) to be identified (extracted) in an appropriate manner.

It is an object of the present invention to provide an object detection apparatus, a program, and an integrated circuit that enable the contour of a target to be detected (estimated) in an appropriate manner even in an image in which the target and its background have almost no contrast in a predetermined direction of the image.

SUMMARY OF THE INVENTION

To achieve the above object, a first aspect of the present invention provides an object detection apparatus including a first direction contour component extraction unit, a second direction continuity detection unit, and an object area detection unit.

The first direction contour component extraction unit extracts, from an input image, a contour component in a first direction of the image.

The second direction continuity detection unit detects a continuity of the contour component extracted by the first direction contour component extraction unit in a second direction of the image that is perpendicular to the first direction.

The object area detection unit detects a contour of an object in the image based on the continuity of the contour component in the second direction extracted by the second direction continuity detection unit.

BRIEF DESCRIPTION OF THE DRAWINGS

FIG. 9B shows an image indicating the detected continuity in the horizontal direction for describing a contour detection (estimate) process;

DESCRIPTION OF THE PREFERRED EMBODIMENTS

First Embodiment

A first embodiment will now be described with reference to the drawings.

1.1 Structure of Object Detection System

Figure 1:
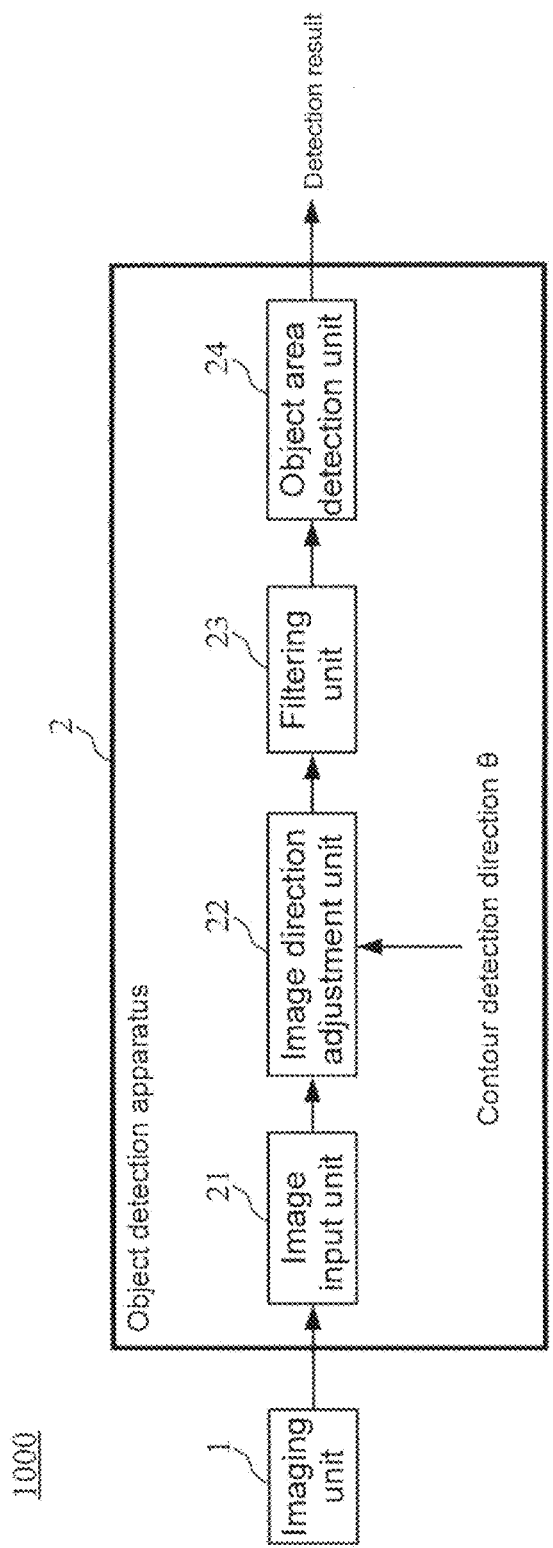
FIG. 1 shows the schematic structure of an object detection system 1000 according to a first embodiment.

FIG. 1 shows the schematic structure of an object detection system 1000 according to the first embodiment.

As shown in FIG. 1, the object detection system 1000 includes an imaging unit 1 and an object detection apparatus 2.

The imaging unit 1 includes an optical system (not shown), which focuses light from a subject, and an image sensor (not shown), which converts light from the subject focused through the optical system into an image signal (electric signal) by photoelectric conversion. The image sensor may be, for example, a charge-coupled device (CCD) image sensor or a complementary metal oxide semiconductor (CMOS) image sensor. The imaging unit 1 outputs an image (image signal) captured by the image sensor to the object detection apparatus 2.

As shown in FIG. 1, the object detection apparatus 2 includes an image input unit 21, an image direction adjustment unit 22, a filtering unit 23, and an object area detection unit 24.

The image input unit 21 receives an image (image signal) output from the imaging unit 1. When, for example, the imaging unit 1 includes a CCD image sensor including color filters with an RGB Bayer pattern, the image input unit 21 receives a pixel signal array of, for example, R-component signals, G-component signals, and B-component signals. The image input unit 21 converts the input image signals into signals with a predetermined format as necessary, and outputs the resulting image signals (or the input image signals when no conversion is necessary) to the image direction adjustment unit 22.

The term "converting into signals with a predetermined format" refers to, for example, converting into signals with a different color space (e.g., conversion from the RGB color space to the YCbCr color space). The image input unit 21 converts the input image signals in the RGB color space (R-component signals, G-component signals, and B-component signals) into, for example, signals in the YCbCr color space (Y-component signals, Cb-component signals, and Cr-component signals) as necessary.

For ease of explanation in one example described below, the image input unit 21 converts input image signals in the RGB color space (R-component signals, G-component signals, and B-component signals) into signals in the YCbCr color space (Y-component signals, Cb-component signals, and Cr-component signals), and outputs only Y-signals, which are brightness signals (brightness image), to the image direction adjustment unit 22.

The image direction adjustment unit 22 receives brightness signals (brightness image) output from the image input unit 21. The image direction adjustment unit 22 receives information about the direction in which the contour is to be detected in the image. The image direction adjustment unit 22 rotates the input image in a manner that the contour detection direction becomes the vertical direction of the image. The image direction adjustment unit 22 outputs the resulting image to the filtering unit 23.

The "contour detection direction" refers to the direction of the image in which contour components are to be detected.

Figure 2:
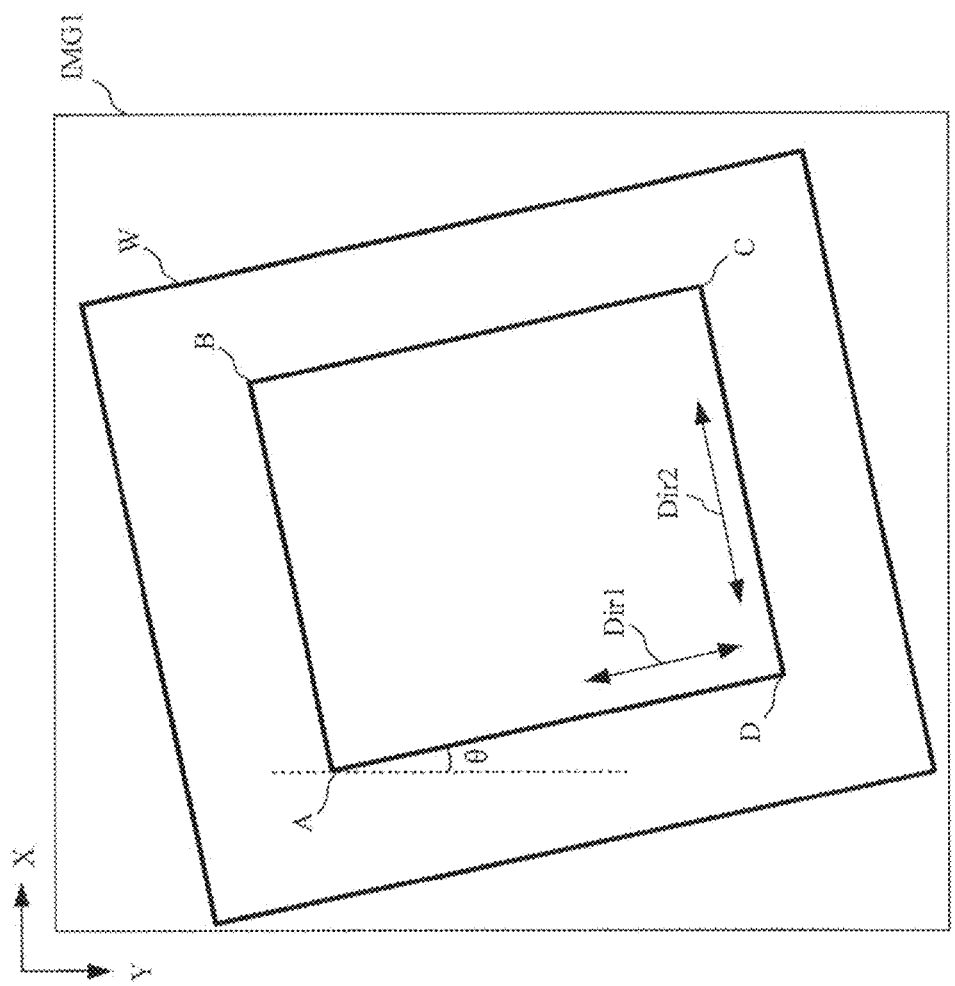
FIG. 2 is a diagram describing a contour detection direction and the processing performed by an image direction adjustment unit 22.

The contour detection direction will now be described with reference to FIG. 2. FIG. 2 schematically shows an image IMG1 (an image example) output from the image input unit 21.

When, for example, contour portions AD and BC of a rectangular object ABCD shown in FIG. 2 are to be detected, a direction Dir1 parallel to the straight lines AD and BC (direction indicated by an arrow Dir1 shown in FIG. 2) is the contour detection direction. The contour detection direction can be identified by using, for example, an angle θ formed by the contour detection direction and the vertical direction (Y-axis direction) (angle θ shown in FIG. 2).

Figure 3:
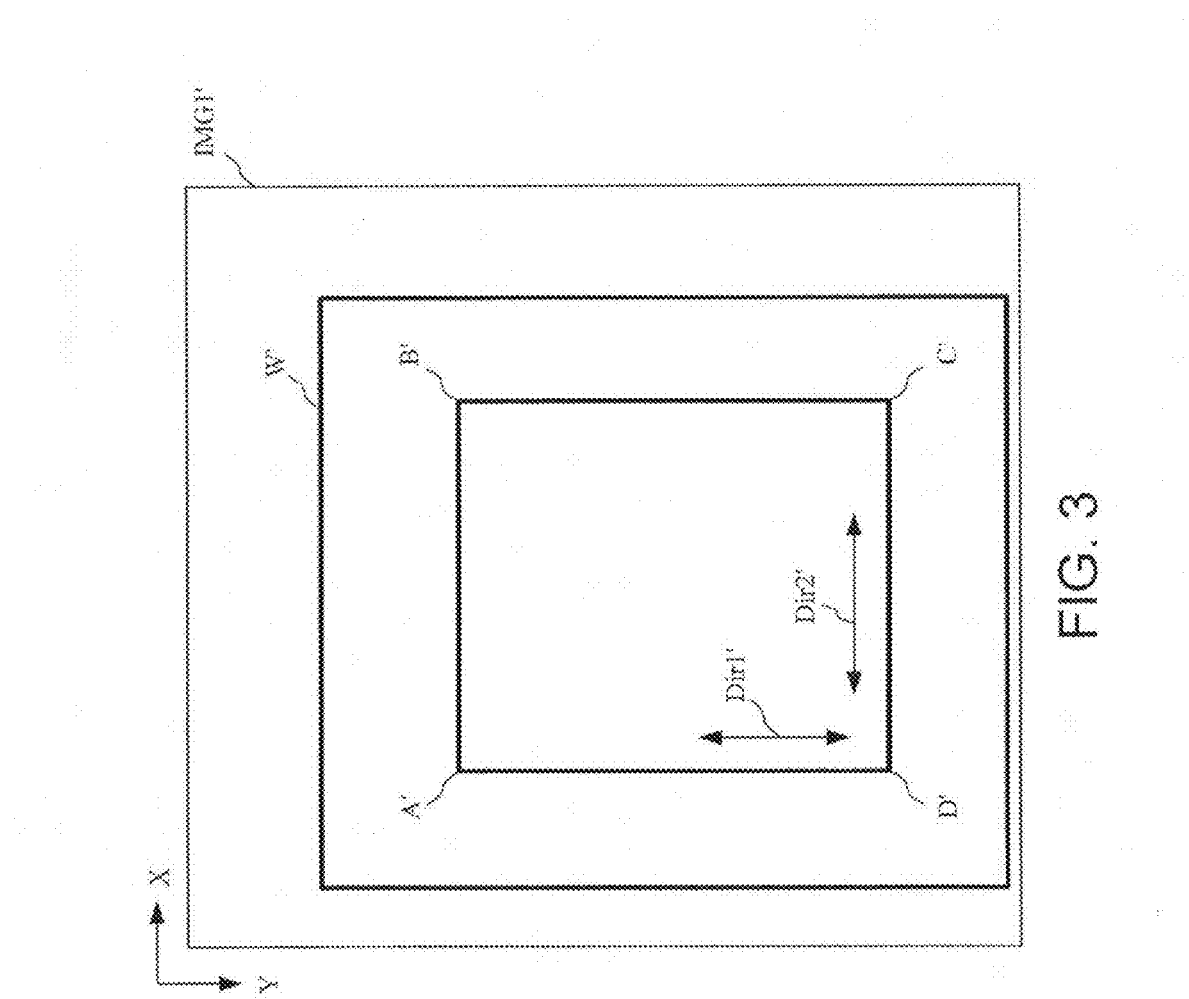
FIG. 3 is a diagram describing the contour detection direction and the processing performed by the image direction adjustment unit 22.

The image direction adjustment unit 22 rotates the input image based on the angle θ, which represents the information about the contour detection direction of the image. More specifically, the image direction adjustment unit 22 performs processing for rotating the input image clockwise by the angle θ. FIG. 3 shows an image IMG1', which results from the above processing of the image IMG1 shown in FIG. 2 (rotating the image clockwise by the angle θ). The rectangular object ABCD shown in FIG. 2 is rotated to yield the rectangular object A'B'C'D' shown in FIG. 3. As shown in FIG. 3, the direction along the contour portions A'D' and B'C' of the rectangular object (direction indicated by an arrow Dir1' in FIG. 3) is the vertical direction of the image. In other words, the contour detection direction in the rotated image is the vertical direction (Y-axis direction) of the image. Also, the direction perpendicular to the contour detection direction in the rotated image (direction indicated by an arrow Dir2' in FIG. 3) is the horizontal direction (X-axis direction) of the image.

After the above processing, the image direction adjustment unit 22 outputs the resulting image to the filtering unit 23.

Figure 4:
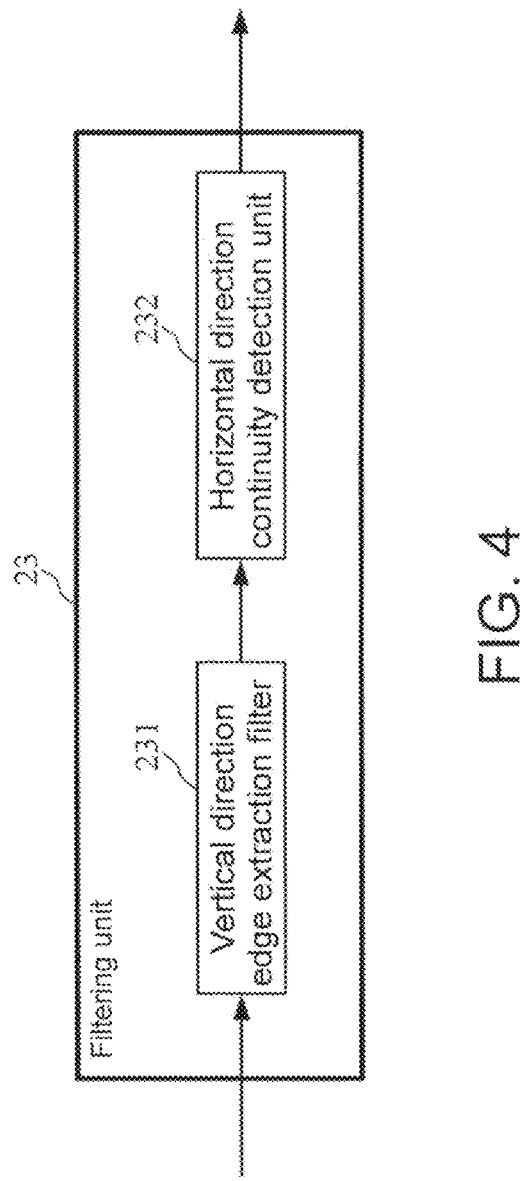
FIG. 4 shows the schematic structure of a filtering unit 23 in the first embodiment.

As shown in FIG. 4, the filtering unit 23 includes a vertical direction edge extraction filter 231 and a horizontal direction continuity detection unit 232.

The vertical direction edge extraction filter 231 receives an image output from the image direction adjustment unit 22. The vertical direction edge extraction filter 231 extracts edge components in the vertical direction of the input image through two-dimensional filtering to generate a vertical edge component extracted image. The vertical direction edge extraction filter 231 outputs the generated vertical edge component extracted image to the horizontal direction continuity detection unit 232.

The horizontal direction continuity detection unit 232 receives a vertical edge component extracted image output from the vertical direction edge extraction filter 231. The horizontal direction continuity detection unit 232 detects the continuity of the vertical edge components in the horizontal direction of the image (described in detail later), and outputs the image indicating the detected continuity to the object area detection unit 24.

The object area detection unit 24 receives an image output from the filtering unit 23 (image from which the continuity in the horizontal direction has been detected). The object area detection unit 24 detects (estimates) the contour of the object from the input image. The object area detection unit 24 then outputs the result of detection (estimate).

1.2 Operation of Object Detection System

The operation of the object detection system 1000 with the above structure will now be described.

Figure 6:
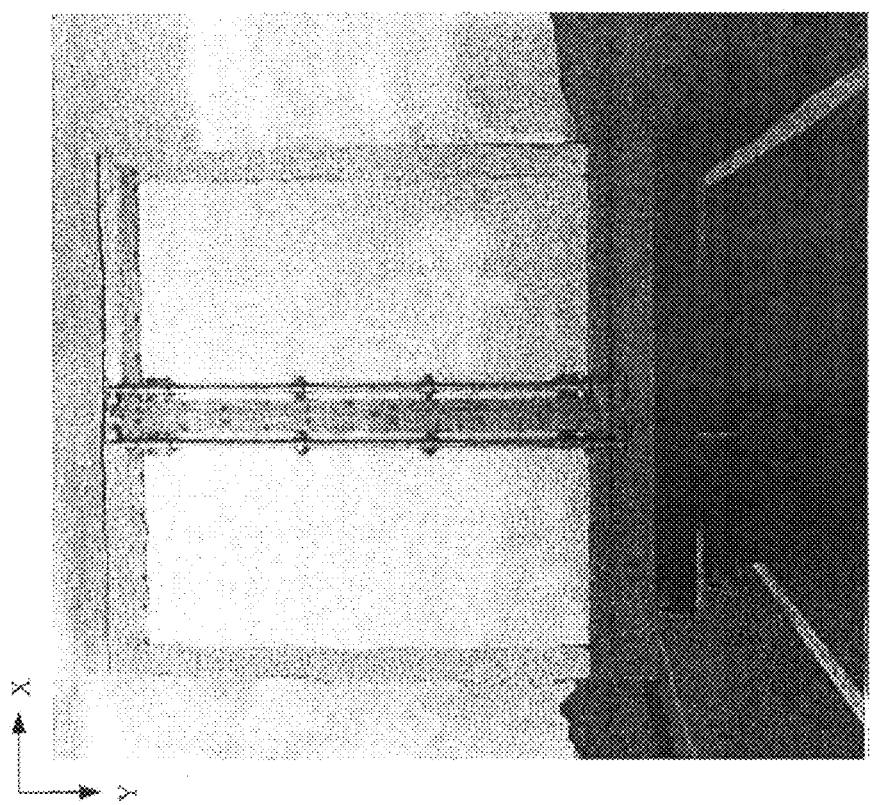
FIG. 6 shows an input image.

In the example described below, an image shown in FIG. 6 is captured by the imaging unit 1, and is input into the object detection apparatus 2. The object (vehicle) captured in the image shown in FIG. 6 has a small contrast (brightness difference) in its contour portions in the horizontal direction (X-axis direction). A typical edge detection process would fail to detect (estimate) the contour in an appropriate manner in this image.

The image shown in FIG. 6 is input into the image input unit 21. The image input into the image input unit 21 is a brightness image. In this case, the input image is output directly from the image input unit 21 to the image direction adjustment unit 22 without being subjected to conversion or any other processes (color space conversion or other processes) in the image input unit 21.

The input image undergoes an image rotation process performed by the image direction adjustment unit 22, in which the image is rotated by the angle θ relative to the contour detection direction. In this example, the contour detection direction is Y-axis direction.

With the contour detection direction being Y-axis direction (θ=0°), the input image is directly output to the vertical direction edge extraction filter 231 of the filtering unit 23, without the need to rotate the image in the image direction adjustment unit 22.

The vertical direction edge extraction filter 231 of the filtering unit 23 subjects the input image to processing for extracting edge components in the vertical direction. The vertical direction edge extraction filter 231 subjects the input image to, for example, two-dimensional filtering using a filter operator represented by Formula 1 (convolution matrix) (hereafter referred to as a filter operator F1), and a filter operator represented by Formula 2 (convolution matrix) (hereafter referred to as a filter operator F2).

Formula 1
$$\begin{bmatrix} 1 & 1 & 1 \\ 0 & 0 & 0 \\ -1 & -1 & -1 \end{bmatrix} \quad (1)$$

Formula 2
$$\begin{bmatrix} -1 & -1 & -1 \\ 0 & 0 & 0 \\ 1 & 1 & 1 \end{bmatrix} \quad (2)$$

More specifically, the vertical direction edge extraction filter 231 performs the processing expressed by the equations below:

$$Fc1(x1,y1)=\text{clip}(F1(x1,y1),d0),$$

$$Fc2(x1,y1)=\text{clip}(F2(x1,y1),d0), \text{ and}$$

$$Dout(x1,y1)=k1\times(Fc1(x1,y1)+Fc2(x1,y1)),$$

where F1(x1, y1) is the result of the two-dimensional filtering performed on the pixel at the coordinates (x1,y1) of the image using the filter operator F1 (Formula 1), F2($x1$, y1) is the result of the two-dimensional filtering performed on the pixel at the coordinates (x1, y1) of the image using the filter operator F2 (Formula 2), and d0 is a constant, k1 is a coefficient, and clip(x, d) is a function written as clip(x, d)=d when x<d and written as clip(x, d)=x when x≥d (a function that performs clipping to a lower limit).

Setting d0=0 yields Fc1($x1$, y1) and Fc2($x1$, y1) being either 0 or positive values. This simplifies the clipping process.

To allow the value of Dout(x1, y1) to fall within a predetermined range (e.g., a range of values that can be expressed by 8-bit data, or specifically 0 to 255), any value outside the predetermined range may be clipped either to the upper limit or to the lower limit.

Alternatively, the processing expressed by the equation below may be performed.

$$Dout(x1,y1)=\max(k2\times F1(x1,y1),k2\times F2(x1,y1))$$

where max( ) is a function that returns a maximum value among elements, and k2 is a coefficient.

To allow the value of Dout(x1, y1) to fall within a predetermined range (e.g., a range of values that can be expressed by 8-bit data, or specifically 0 to 255), any value outside the predetermined range may be clipped either to the upper limit or to the lower limit.

Figure 7:
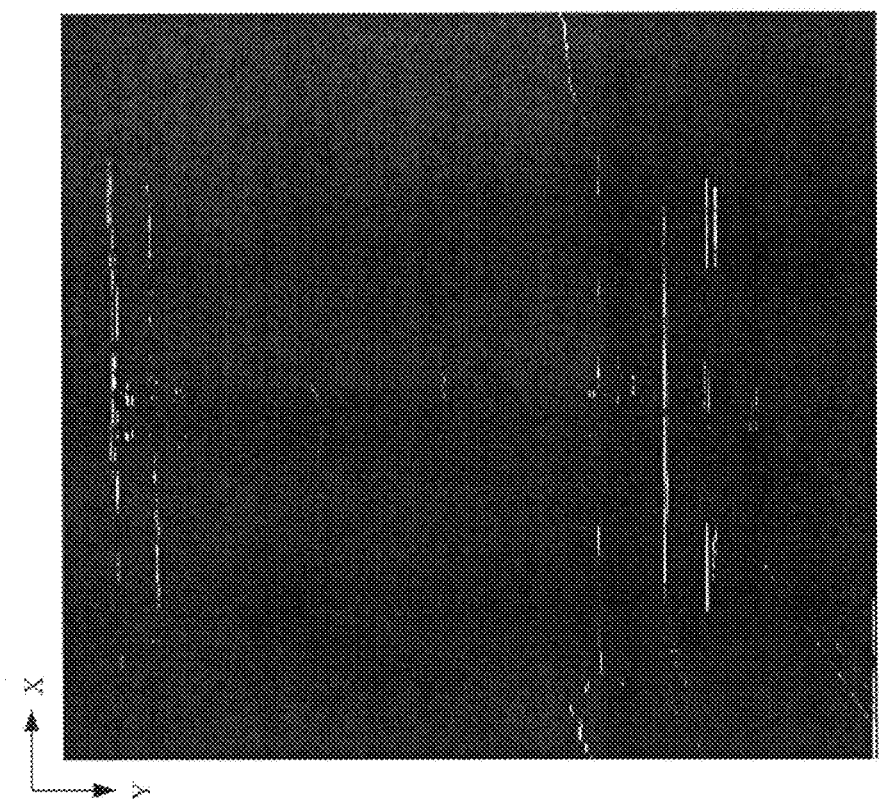
FIG. 7 shows an image in which edge components in the vertical direction have been extracted.

The vertical direction edge extraction filter 231 obtains an image in which the pixel at the coordinates (x1,y1) has the calculated pixel value Dout(x1, y1). FIG. 7 shows an image in which the vertical edge components have been extracted (vertical edge component extracted image) by subjecting the image shown in FIG. 6 to the above processing.

The filter operators described above are mere examples, and any other filter operators that enable edge components in the vertical direction to be extracted may be used.

The vertical edge component extracted image obtained through the above processing performed by the vertical direction edge extraction filter 231 is then output to the horizontal direction continuity detection unit 232.

Figure 8:
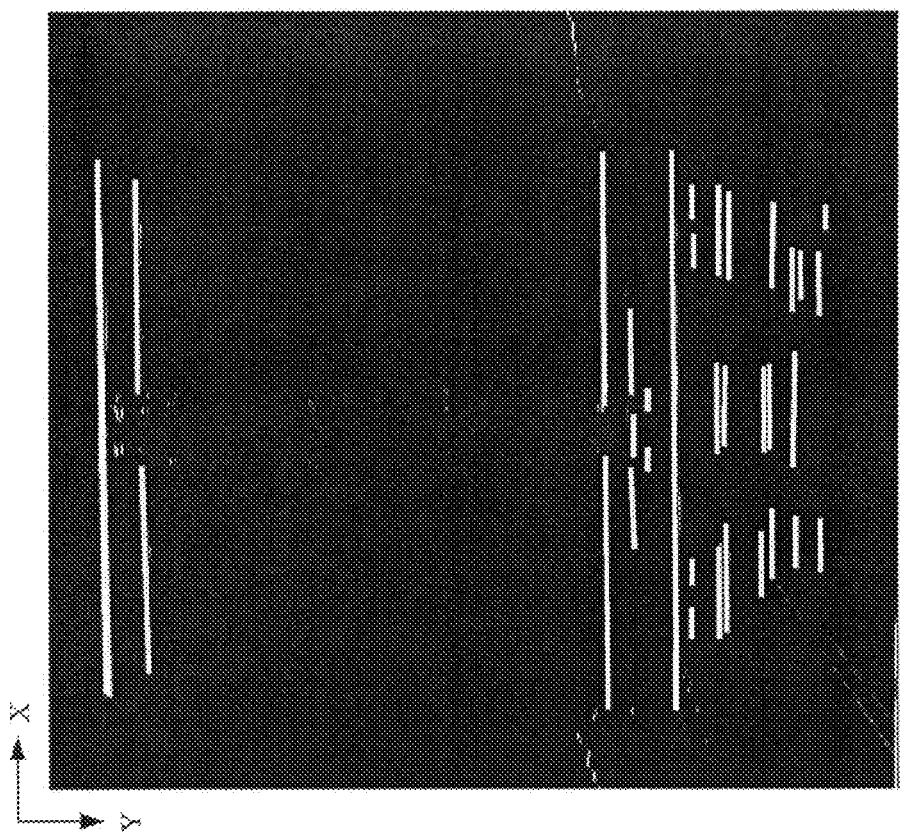
FIG. 8 shows an image indicating the detected continuity in the horizontal direction.

The horizontal direction continuity detection unit 232 detects the continuity of the input vertical edge component extracted image in the horizontal direction (X-axis direction) of the image. More specifically, the horizontal direction continuity detection unit 232 determines, as a pixel continuous in the horizontal direction, a pixel having a pixel value equal to or greater than a predetermined threshold Th in the horizontal direction or in a direction with at least a predetermined angle relative to the horizontal direction, and sets the pixel value to, for example, 1 (to the upper limit of possible pixel values (or to 255 for 8-bit data (0 to 255))). FIG. 8 shows an image indicating the detected continuity in the horizontal direction generated by subjecting the image shown in FIG. 7 to the above processing. In FIG. 8, thick lines each indicate a group of pixels determined to have continuity in the horizontal direction.

The image in which the horizontal continuity has been detected (horizontal continuity detected image), generated through the above processing performed by the horizontal direction continuity detection unit 232, is output to the object area detection unit 24. The horizontal direction continuity detection unit 232 may output the values of pixels included in the horizontal continuity detected image area, or may output the integral value (integrated value) of pixels included in the image area to the object area detection unit 24.

The contour of the object is detected (estimated) by the object area detection unit 24 based on the image indicating the detected continuity in the horizontal direction. The object area detection unit 24 may detect, for example, the rightmost end point and the leftmost end point of each image area that has been determined to have continuity in the horizontal direction (image area elongated in the horizontal direction), and may detect (estimate) the contour of the object by estimating the contour line of the object in the vertical direction (contour detection direction) based on the detected rightmost end point and the detected leftmost end point.

In one example, the object area detection unit 24 estimates the contour of the object with the procedure (1) to (5).

(1) The object area detection unit 24 detects, among the image areas that have been determined to have continuity in the horizontal direction (among the image areas elongated in the horizontal direction), an image area including more pixels with large values and having higher continuity in the horizontal direction (an area longer in the horizontal direction). The detected image area includes large edge components in the vertical direction and is long in the horizontal direction, and thus can be used to determine the contour of the object. This improves the detection (estimate) accuracy of the contour of the object.

Figure 9A:
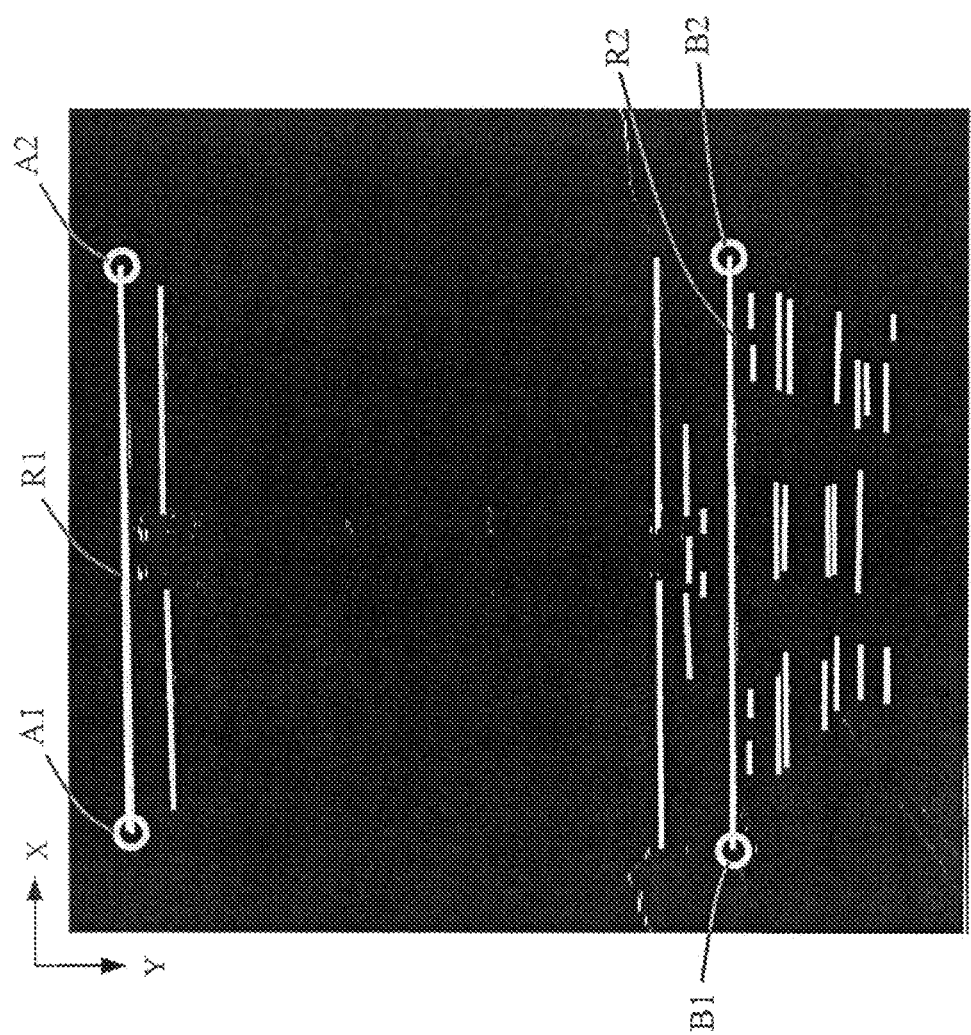
FIG. 9A shows an image indicating the detected continuity in the horizontal direction for describing a contour detection (estimate) process.

In one example, the image areas R1 and R2 shown in FIG. 9A are detected in this process (1).

(2) The object area detection unit 24 detects the leftmost end point (end point in the horizontal left direction or the negative X-axis direction) and the rightmost end point (end point in the horizontal right direction or the positive X-axis direction) from the image area detected in the process (1).

In FIG. 9A, for example, the points A1, A2, B1, and B2 are the detected leftmost end points (end points in the horizontal left direction or the negative X-axis direction) and the detected rightmost end points (end point in the horizontal right direction or the positive X-axis direction) of the image areas through performing the process (2). The point A1 (at the coordinates (x_A1, y_A1)) is the leftmost end point of the image area R1. The point A2 (at the coordinates (x_A2, y_A2)) is the rightmost end point of the image area R1. The point B1 (at the coordinates (x_B1, y_B1) is the leftmost end point of the image area R2. The point B2 (at the coordinates (x_B2, y_B2)) is the rightmost end point of the image area R2.

(3) The object area detection unit 24 detects, from the leftmost end points and the rightmost end points detected in the process (2), the leftmost point X_min (the point at the smallest X-coordinate) and the rightmost point X_max (the point at the largest X-coordinate). The point X_min is at the coordinates (x_min, y_min) on the image. The point X_max is at the coordinates (x_max, y_max) on the image.

For example, the point X_min is the point B1, and the point X_max is the point B2 in FIG. 9A. In other words, x_min=x_B1, and x_max=x_B2.

(4) The object area detection unit 24 detects the leftmost end point and the rightmost end point in the area where x_min≤x≤x_max (where x is the X-coordinate on the image) (area surrounded by an alternate short and long dash line in FIG. 9B, or area inward from the alternate short and long dash line) on substantially identical horizontal lines (horizontal lines with the same Y-coordinate or with the Y-coordinates that fall within a predetermined range).

The object area detection unit 24 may detect the leftmost end point and the rightmost end point in the area where x_min±E1≤x≤x_max±E2 (where x is the X-coordinate on the image, and E1 and E2 are positive real numbers) on substantially identical horizontal lines (horizontal lines with the same Y-coordinate or with the Y-coordinates that fall within a predetermined range).

The values E1, E2 may be set using the formulas below.

$$E1=(x\_max-x\_min)\times rate1, \text{ and}$$

$$E2=(x\_max-x\_min)\times rate2,$$

where rate1 and rate2 are positive real numbers.

(5) The object area detection unit 24 estimates the contour line in the vertical direction by connecting between the leftmost end points and between the rightmost end points detected in the process (4) (sequentially in the positive Y-axis direction).

Among the leftmost end points to be connected and the rightmost end points to be connected, any points that would generate unnaturally (extremely) complex contour lines in the vertical direction may be excluded.

Figure 9C:
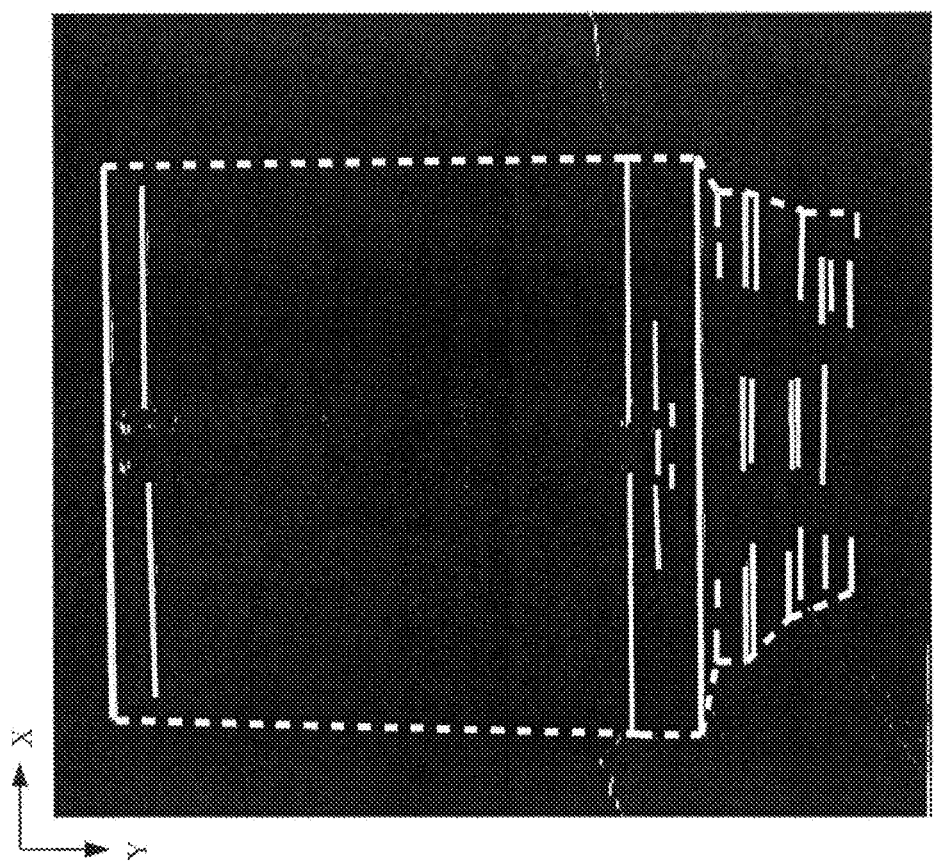
FIG. 9C shows an image indicating the detected (estimated) contour of the object.
Figure 10:
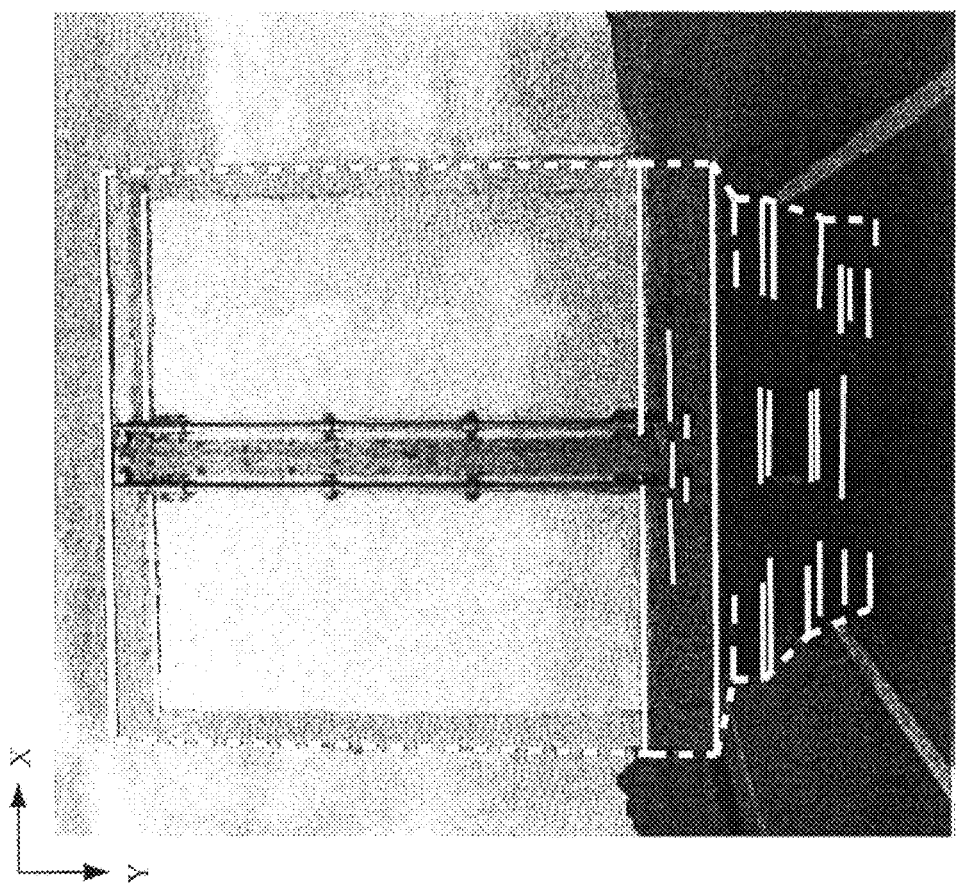
FIG. 10 shows an image overlaying the detected (estimated) contour of the object on the input image.

FIG. 9C shows the image indicating the contour of the object detected (estimated) by subjecting the image shown in FIG. 7 to the above processing. The dotted line in FIG. 9C indicates the detected (estimated) contour of the object in the vertical direction (contour detection direction). FIG. 10 shows an image overlaying the detected (estimated) contour of the object shown in FIG. 9C on the input image. As shown in FIG. 9C and FIG. 10, the contour of the object in the vertical direction (contour detection direction) is detected (estimated) in an appropriate manner.

As described above, the object detection apparatus 2 detects a degree of change in the pixel value in the contour detection direction of the image (vertical direction in FIG. 6) (edge component amount in the contour detection direction), and identifies (detects) an image area including pixels that are continuous in the direction perpendicular to the contour detection direction (horizontal direction in FIG. 6) and that each have a large amount of edge component in the contour detection direction. The object detection apparatus 2 then detects (estimates) the contour of the object in the contour detection direction based on the detected image area. The above processing enables the object detection apparatus 2 to appropriately detect (estimate) the contour of an object even in an image that has a small contrast (brightness difference) in a direction perpendicular to a predetermined direction (e.g., a direction perpendicular to the contour detection direction, which is the horizontal direction in FIG. 6), so that it is difficult for conventional techniques to appropriately detect (estimate) the contour of an object in the direction perpendicular to the predetermined direction (contour detection direction, or the vertical direction in FIG. 6).

The above processing for detecting (estimating) the contour of an object is effective particularly when a vehicle is to be detected by the object detection apparatus 2. An image capturing a vehicle normally includes many horizontal lines (e.g., many horizontal lines in the vehicle bumper, rear window, rear panel, trunk, and rear doors, and upper and lower edges of the body). The above processing enables the object detection apparatus 2 to detect the continuity of the target (vehicle) in the horizontal direction in an appropriate manner. As a result, the object detection apparatus 2 detects an image area including the target (vehicle) (e.g., the horizontal width of the target or an image area in the horizontal direction) in an appropriate manner (detects or estimates the contour of the object in an appropriate manner).

The object detection apparatus 2 can also detect (estimate) the contour of objects including many horizontal lines (object including many elongated contour lines), other than vehicles, in an appropriate manner through the above processing. For example, the object detection apparatus 2 can detect (estimate) the contour of a train, a piece of furniture, a building, and a piece of plant machinery.

First Modification

A first modification of the above embodiment will now be described.

An object detection system of this modification has the same structure as the object detection system 1000 according to the first embodiment. The object detection system of this modification differs from the object detection system 1000 of the first embodiment in the processing performed by the vertical direction edge extraction filter 231. The other processing and components of the object detection system of this modification are the same as those of the object detection system 1000 of the first embodiment and will not be described in detail.

The vertical direction edge extraction filter 231 in the object detection system of this modification subjects an input image only to the processing performed using a filter operator (convolution matrix) F1 represented by Formula 1. The vertical direction edge extraction filter 231 of the modification performs processing expressed by the formula below:

$$Dout(x1,y1)=F1(x1,y1).$$

To allow the value of Dout(x1, y1) to fall within a predetermined range (e.g., a range of values that can be expressed by 8-bit data, or 0 to 255), any value outside the predetermined range may be clipped either to the upper limit or to the lower limit.

Figure 11:
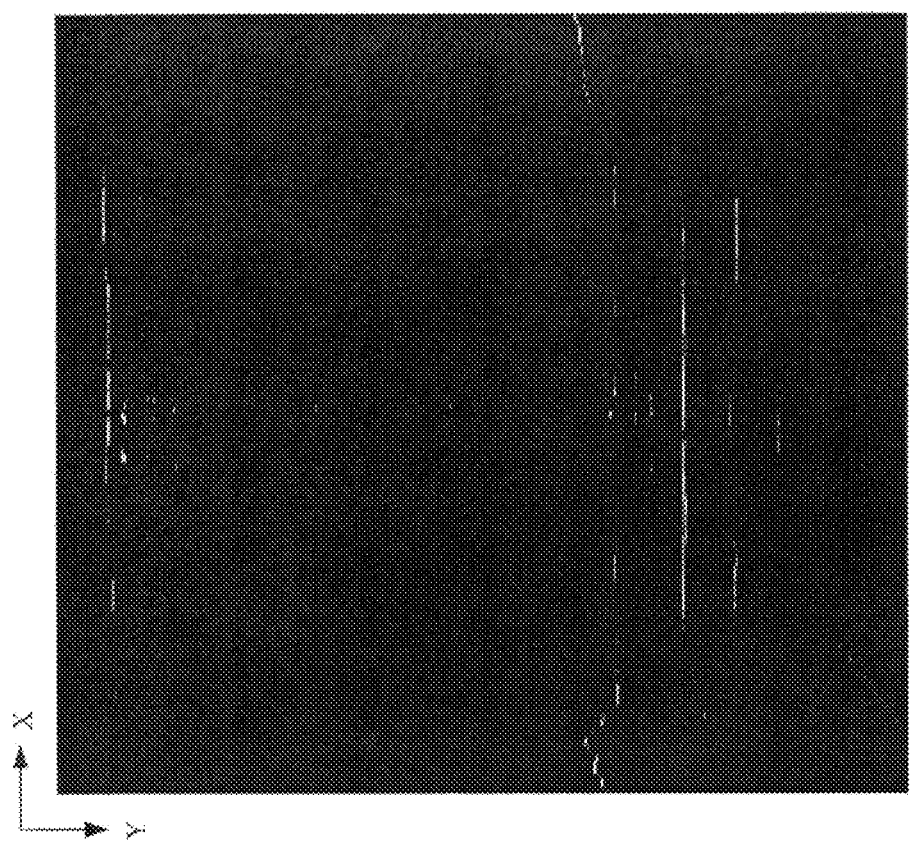
FIG. 11 shows an image indicating the extracted edge components in the vertical direction (first modification of the first embodiment)

The vertical direction edge extraction filter 231 obtains an image having the calculated value Dout(x1, y1) as the value of the pixel at the coordinates (x1, y1). FIG. 11 shows a vertical edge component extracted image obtained by subjecting the image (input image) shown in FIG. 6 to the above processing.

Figure 12:
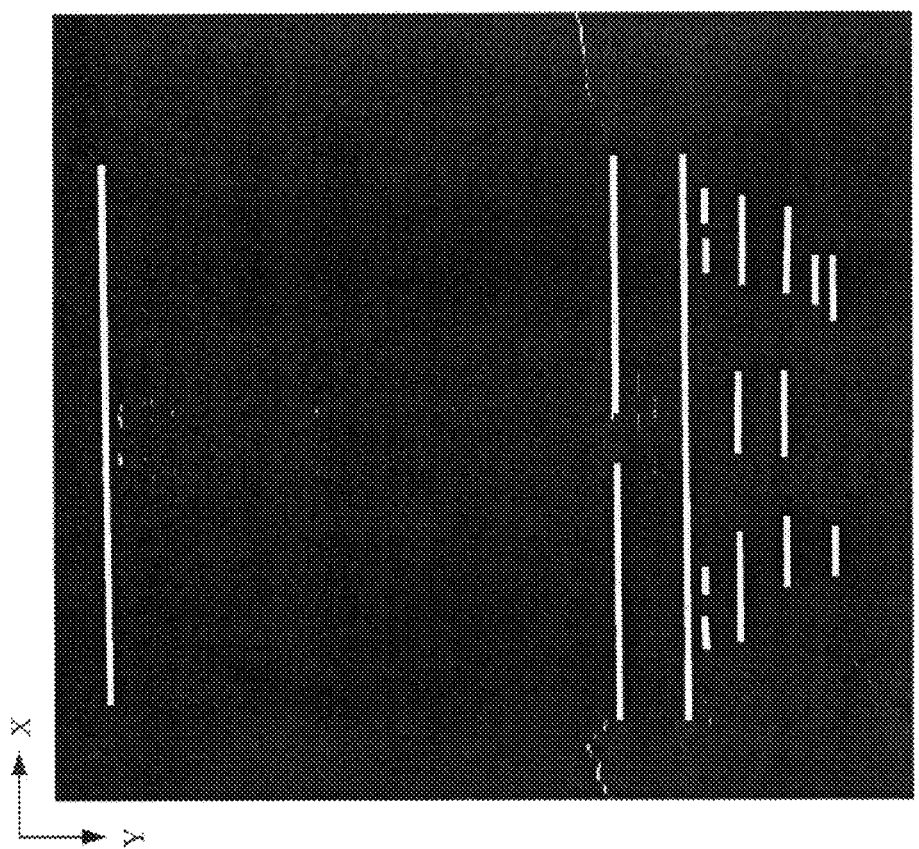
FIG. 12 shows an image indicating the detected continuity in the horizontal direction (first modification of the first embodiment)
Figure 13:
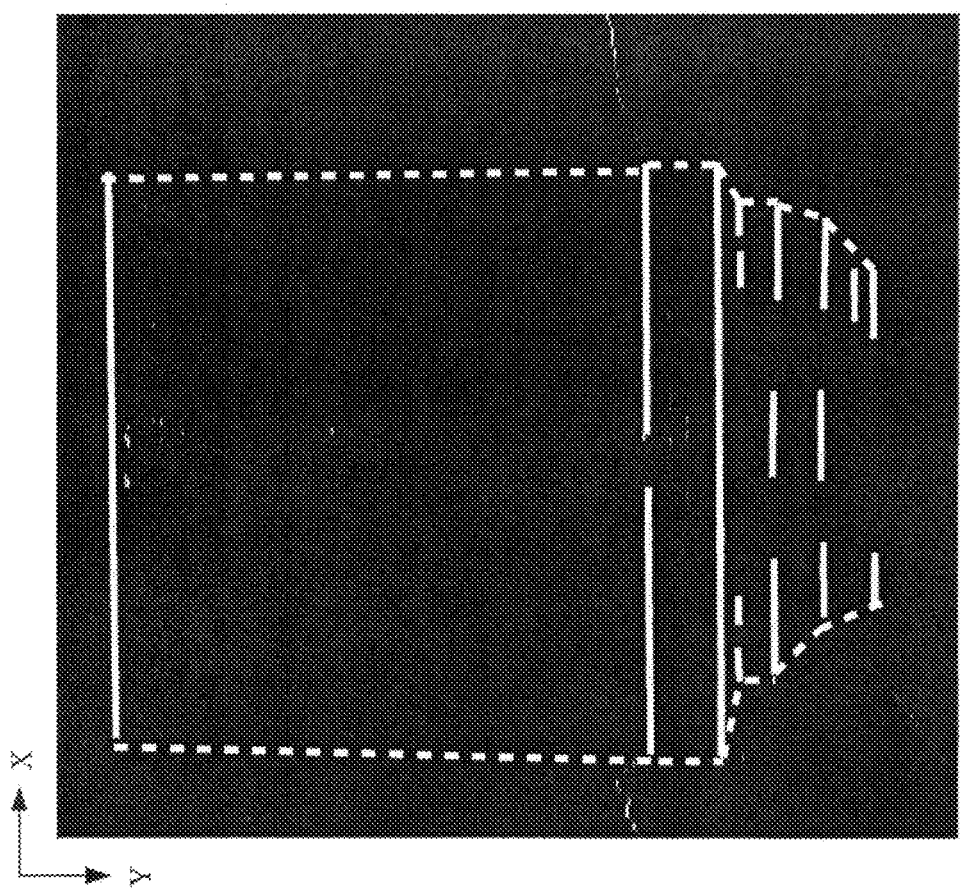
FIG. 13 shows an image indicating the detected (estimated) contour of the object (first modification of the first embodiment)
Figure 14:
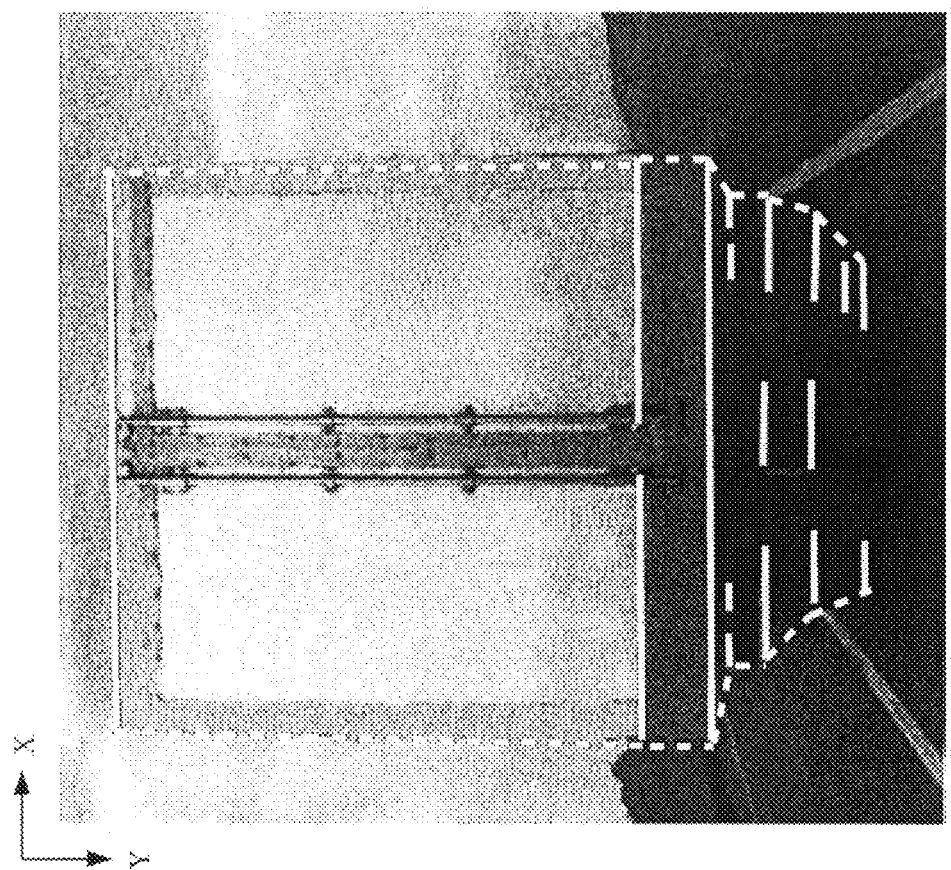
FIG. 14 shows an image overlaying the detected (estimated) contour of the object on the input image (first modification of the first embodiment)

FIG. 12 shows an image obtained by subjecting the image shown in FIG. 11 to the processing performed by the horizontal direction continuity detection unit 232. FIG. 13 shows an image obtained by subjecting the image shown in FIG. 12 to the processing performed by the object area detection unit 24. FIG. 14 shows an image overlaying the detected (estimated) contour of the object shown in FIG. 13 on the input image. As shown in FIGS. 13 and 14, the contour of the object in the vertical direction (contour detection direction) is detected (estimated) in an appropriate manner.

In the object detection system of this modification described above, the vertical direction edge extraction filter 231 performs filtering using the filter operator F1. The filter operator F1 (filter operator F1 represented by the convolution matrix of Formula 3) can extract an image area with pixel values that become greatly lower in the positive Y-axis direction of the image (Y-axis direction shown in FIGS. 11 to 14 and other figures) in an appropriate manner. For example, an input image including a vehicle running on a road as a subject may include a relatively bright image area including the vehicle body, and a relatively dark image area including the tires of the vehicle. The processing using the filter operator F1 enables the object detection system to detect edge components in the vertical direction forming a lower portion of the vehicle running on the road (an area including the vehicle body and the tires) in an appropriate manner. The object detection system of this modification thus simplifies the filtering process needed for an input image including, for example, a vehicle running on a road as a subject. Thus, the object detection system of this modification enables the contour of the object to be detected (estimated) in an appropriate manner through the above processing even in an image that has a small contrast (brightness difference) in a direction perpendicular to a predetermined direction (e.g., a direction perpendicular of the contour detection direction, which is the horizontal direction in FIG. 6), so that it is difficult for conventional techniques to appropriately detect (estimate) the contour of an object in an appropriate manner in the direction perpendicular to the predetermined direction (contour detection direction or the vertical direction in FIG. 6).

Second Modification

A second modification of the present embodiment will now be described.

Figure 5:
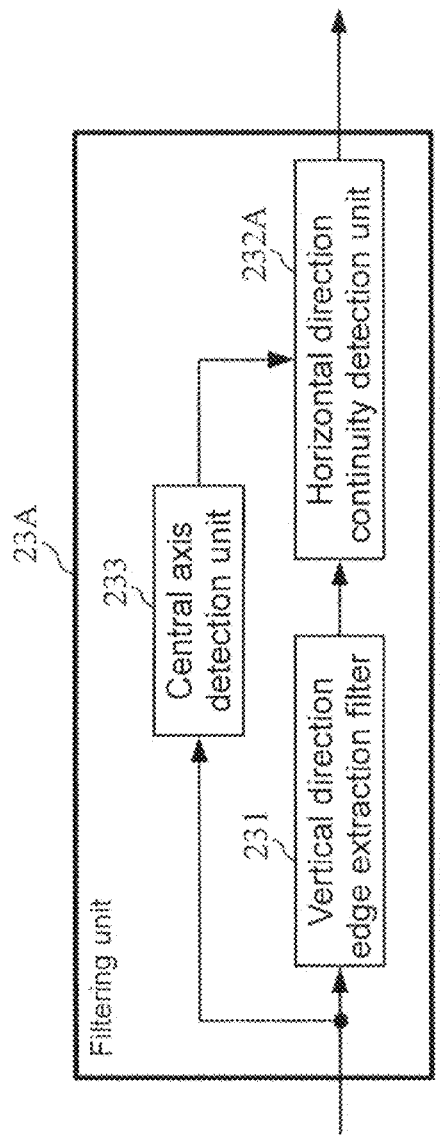
FIG. 5 shows the schematic structure of a filtering unit 23A according to a second modification of the first embodiment.

An object detection system of this modification is the same as the object detection system 1000 of the first embodiment except that it includes a filtering unit 23A shown in FIG. 5, which replaces the filtering unit 23 in the object detection system 1000 of the first embodiment. The components in this modification that are the same as the components described in the above embodiment will be given the same reference numerals as those components and will not be described in detail.

As shown in FIG. 5, the filtering unit 23A in the object detection system of this modification includes a vertical direction edge extraction filter 231, a horizontal direction continuity detection unit 232A, and a central axis detection unit 233.

The vertical direction edge extraction filter 231 is the same as the corresponding component in the above embodiment.

The central axis detection unit 233 receives an image output from the image direction adjustment unit 22. The central axis detection unit 233 detects a highly symmetric object from the input image, and detects the central axis (axis of symmetry, or the axis substantially parallel to the contour detection direction) of the detected object. The central axis detection unit 233 outputs information about the detected central axis (axis of symmetry) of the highly symmetric object to the horizontal direction continuity detection unit 232A. The central axis detection unit 233 detects the central axis (axis of symmetry) of the highly symmetric object with, for example, a technique described in Japanese Patent Application No. 2012-229095.

Figure 15:
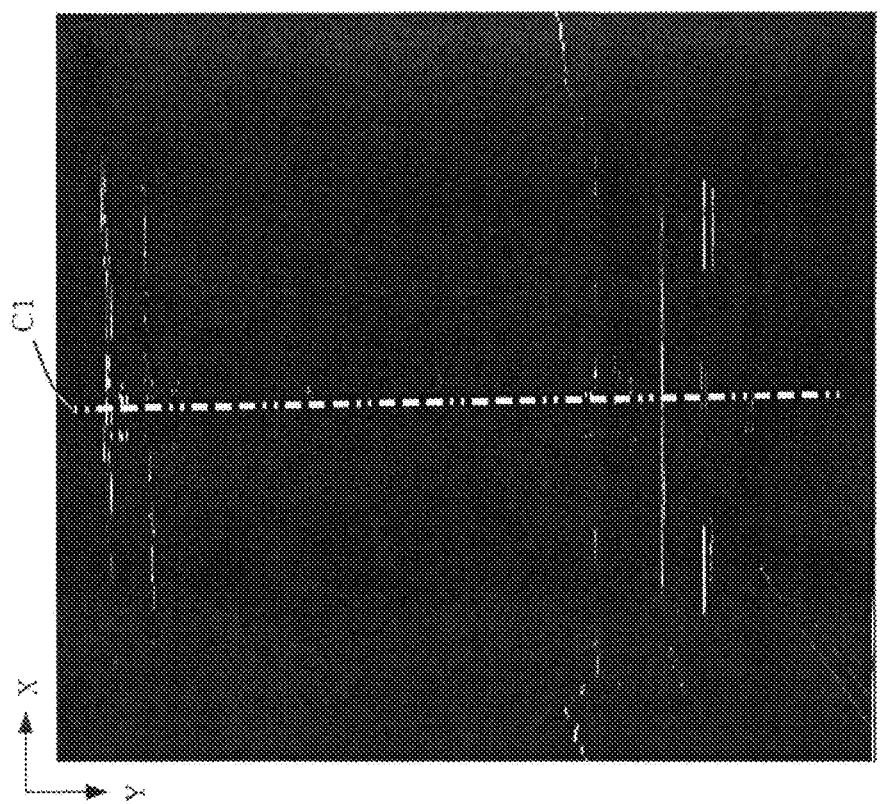
FIG. 15 shows an image overlaying a central axis C1 detected by a central axis detection unit 233 on an image obtained by the vertical direction edge extraction filter 231 (second modification of the first embodiment)

The horizontal direction continuity detection unit 232A receives an image output from the vertical direction edge extraction filter 231, and information about the central axis (axis of symmetry) of the highly symmetric object output from the central axis detection unit 233. The horizontal direction continuity detection unit 232A determines (detects) the continuity in the horizontal direction from the above central axis. A specific process performed will now be described with reference to FIG. 15. FIG. 15 shows an image overlaying the central axis C1 detected by the central axis detection unit 233 on the image obtained by the vertical direction edge extraction filter 231.

First Method

The horizontal direction continuity detection unit 232A traces pixel values from the central axis C1 in the horizontal right direction (positive X-axis direction) and in the horizontal left direction (negative X-axis direction). When the value of a pixel among the pixels traced from the central axis C1 in the horizontal right direction (positive X-axis direction) is equal to or greater than a threshold TH1, the horizontal direction continuity detection unit 232A sets the pixel value to, for example, 1 (to the upper limit of possible pixel values (or to 255 for 8-bit data (0 to 255))). This processing is repeatedly performed on the pixels from the central axis C1 until the value of one pixel in the horizontal right direction (positive X-axis direction) is determined to be smaller than the threshold TH1. The above processing is repeated by using all points aligned with the central axis C1 as the start points for the above tracing.

In the same manner, when the value of a pixel among the pixels traced from the central axis C1 in the horizontal left direction (negative X-axis direction) is equal to or greater than the threshold TH1, the horizontal direction continuity detection unit 232A sets the pixel value to, for example, 1 (to the upper limit of possible pixel values (or to 255 for 8-bit data (0 to 255))). This processing is repeatedly performed on the pixels from the central axis C1 until the value of one pixel in the horizontal left direction (negative X-axis direction) is determined to be smaller than the threshold TH1. The above processing is repeated by using all points aligned with the central axis C1 as the start points for the above tracing.

The direction in which the pixels are traced should not be limited to the precise horizontal direction, but may include a direction with a predetermined angle relative to the horizontal direction (including any substantially horizontal direction).

Second Method

The horizontal direction continuity detection unit 232A may detect the continuity in the horizontal direction with the method described below.

The horizontal direction continuity detection unit 232A traces pixel values from the central axis C1 in the horizontal right direction (positive X-axis direction) and in the horizontal left direction (negative X-axis direction). When a difference between the value of one of the pixels traced from the central axis C1 in the horizontal right direction (positive X-axis direction) and the value of its adjacent pixel (a difference between the values of two pixels adjacent in the tracing direction) is equal to or smaller than a threshold TH3, the horizontal direction continuity detection unit 232A sets the value of that pixel to, for example, 1 (to the upper limit of possible pixel values (or to 255 for 8-bit data (0 to 255))). This processing is repeatedly performed on the pixels from the central axis C1 until the difference between adjacent pixels in the horizontal right direction (positive X-axis direction) exceeds the threshold TH3. The above processing is repeated by using all points aligned with the central axis C1 as the start points for the above tracing.

In the same manner, when a difference between the value of one of the pixels traced from the central axis C1 in the horizontal left direction (negative X-axis direction) and the value of its adjacent pixel (a difference between the values of two pixels adjacent in the tracing direction) is equal to or smaller than the threshold TH3, the horizontal direction continuity detection unit 232A sets the value of that pixel to, for example, 1 (to the upper limit of possible pixel values (or to 255 for 8-bit data (0 to 255))). This processing is repeatedly performed on the pixels from the central axis C1 until the difference between adjacent pixels in the horizontal left direction (negative X-axis direction) exceeds the threshold TH3. The above processing is repeated by using all points aligned with the central axis C1 as the start points for the above tracing.

The direction in which the pixels are traced should not be limited to the precise horizontal direction, but may include a direction with a predetermined angle relative to the horizontal direction (including any substantially horizontal direction).

Figure 16:
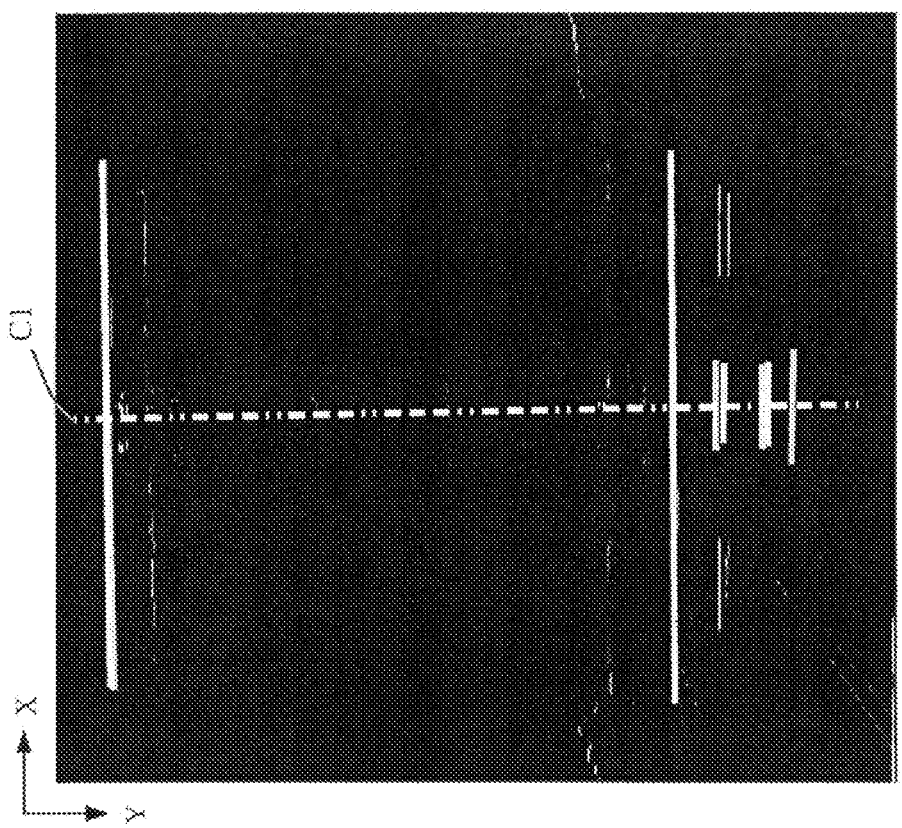
FIG. 16 shows an image including the detected continuity in the horizontal direction (second modification of the first embodiment)

FIG. 16 shows an image indicating the continuity detected in the horizontal direction through the above processing (the horizontal continuity of pixels with large edge components in the vertical direction).

Figure 17:
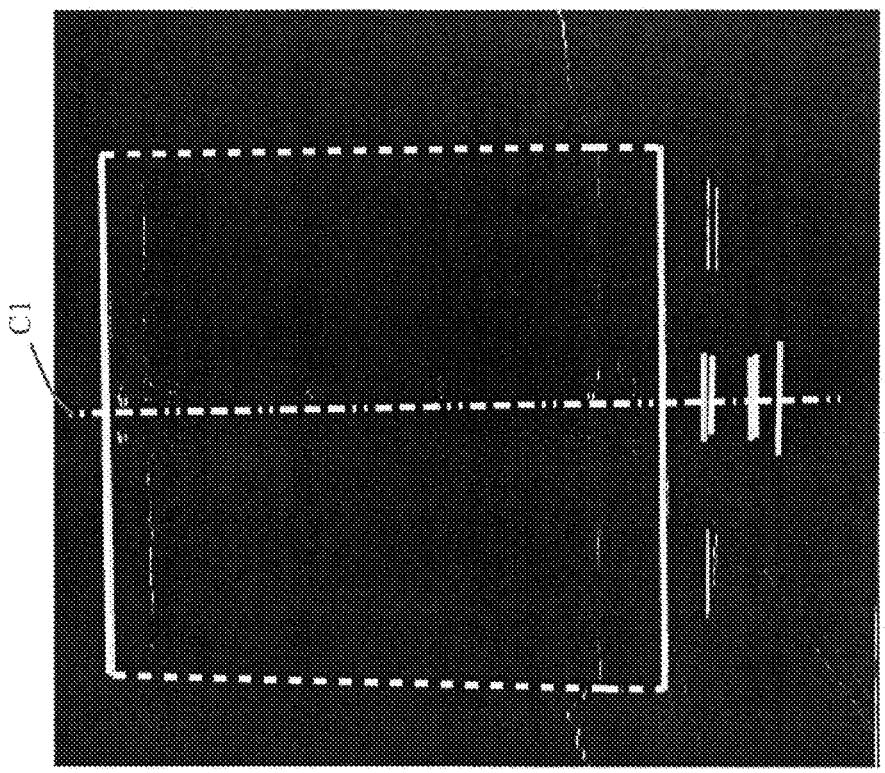
FIG. 17 shows an image including the detected (estimated) contour of the object (second modification of the first embodiment)

FIG. 17 shows an image obtained by subjecting the image indicating the detected continuity shown in FIG. 16 to the above processing performed by the object area detection unit 24.

As shown in FIG. 17, the object detection system of this modification can detect the maximum contour width (corresponding to the width of the vehicle) of the symmetric object (vehicle) in the horizontal direction in an appropriate manner when the input image includes a vehicle as a subject as shown in FIG. 6.

More specifically, the object detection system of this modification detects the central axis (axis parallel to the contour detection direction, or the axis of symmetry) of an object that is highly symmetric in a direction perpendicular to the contour detection direction (the horizontal direction in FIG. 6), and performs the processing for detecting an object based on the detected central axis (axis of symmetry). The above processing enables the object detection system to detect the contour of an object in an appropriate manner even in an image that has a small contrast (brightness difference) in a predetermined direction (e.g., a direction perpendicular to the contour detection direction, which is the horizontal direction in FIG. 6), so that it is difficult for conventional techniques to appropriately detect (estimate) the contour of an object in an appropriate manner in the direction perpendicular to the predetermined direction (contour detection direction, or the vertical direction in FIG. 6). In particular, the object detection system can detect (estimate) the maximum width of a highly symmetric object (maximum width in a direction perpendicular to the contour detection direction) with high accuracy.

Second Embodiment

A second embodiment will now be described.

Figure 18:
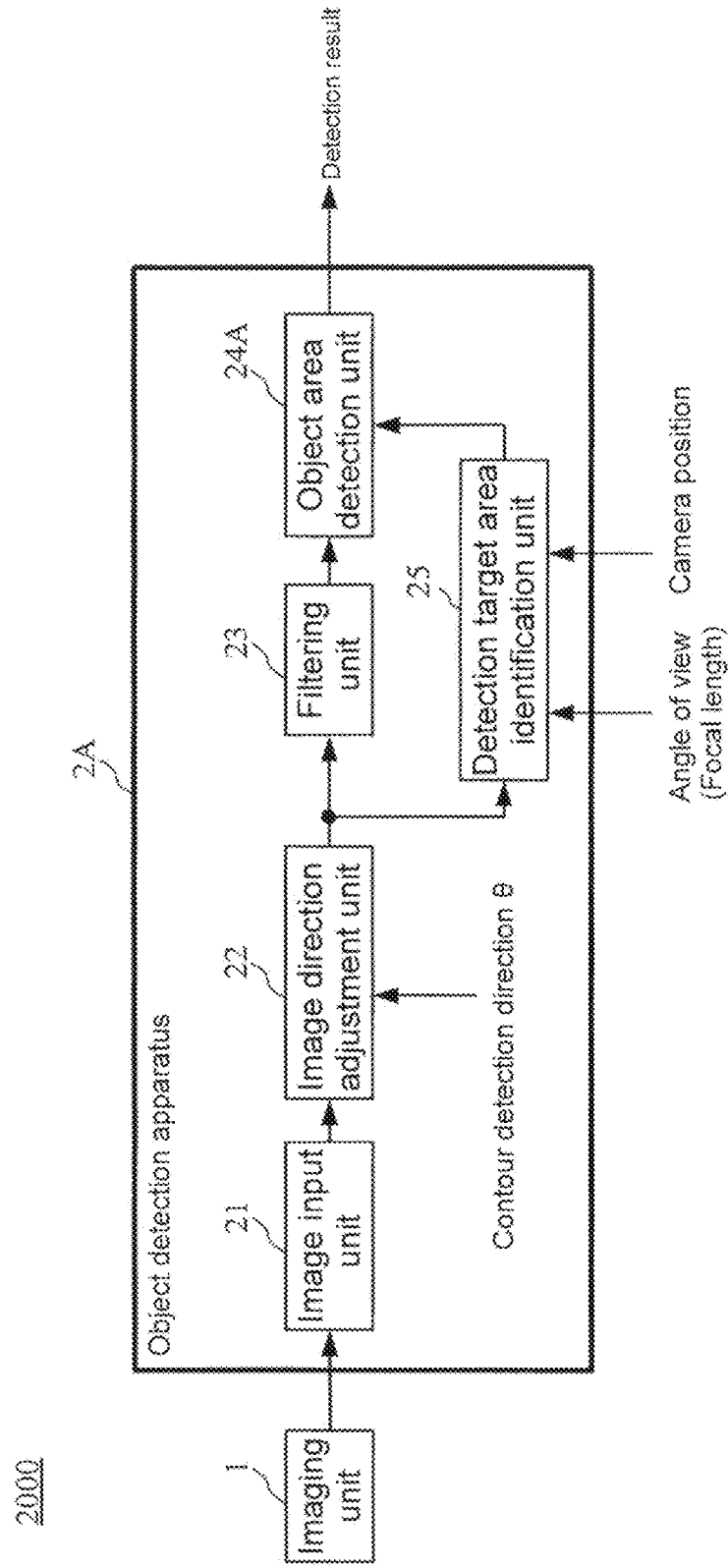
FIG. 18 shows the schematic structure of an object detection system 2000 according to a second embodiment.

FIG. 18 shows the schematic structure of an object detection system 2000 according to the second embodiment.

As shown in FIG. 18, the object detection system 2000 of the present embodiment includes an object detection apparatus 2A, which replaces the object detection apparatus 2 in the object detection system 1000 of the first embodiment. More specifically, as shown in FIG. 18, the object detection system 2000 of the present embodiment is the same as the object detection system 1000 of the first embodiment except that it additionally includes a detection target area identification unit 25 and replaces the object area detection unit 24 with the object area detection unit 24A. The components of the object detection system 2000 of the present embodiment that are the same as the components in the above embodiment are given the same reference numerals and will not be described in detail.

The object detection system 2000 of the present embodiment is mounted on, for example, a vehicle. The imaging unit 1 of the object detection system 2000 is installed, for example, on a front part of the vehicle to capture an image (scene) in front of the vehicle. Alternatively, the imaging unit 1 of the object detection system 2000 may be mounted on a rear part of the vehicle to capture an image (scene) behind the vehicle.

The object detection system 2000 of the present embodiment may detect, for example, an automobile running on a road as a target. In one example described below, the object detection system 2000 may detect a vehicle (e.g., an automobile) running on the road in front.

The detection target area identification unit 25 receives an image (image signal) output from the image direction adjustment unit 22. The detection target area identification unit 25 receives input information indicating the position at which the imaging unit 1 is installed (information about the position at which the camera is installed, or the position at which the imaging unit is installed), and information about the angle of view (or the focal length) of the imaging unit 1.

The detection target area identification unit 25 identifies an image area that can include a vehicle in front based on the input information about the installment position of the imaging unit 1 and the angle of view (or the focal length). More specifically, the detection target area identification unit 25 subjects an input image to the Hough transform to obtain a vanishing point. The size of the vehicle running on a road can be estimated roughly. Thus, the detection target area identification unit 25 identifies an image area that can include an automobile (vehicle) in front based on the relationship between the vanishing point and the angle of view on the image and additionally based on the estimated maximum size of the vehicle. The detection target area identification unit 25 outputs information about the identified image area (hereafter referred to as a processing target image area) to the object area detection unit 24A.

The detection target area identification unit 25 may detect a white line drawn on the road from the input image to identify an image area that can include an automobile (vehicle) in front additionally based on the position of the detected white line. A white line may be detected with, for example, the processing described in Japanese Unexamined Patent Publication No. 2002-175534.

The object area detection unit 24A receives an image output from the filtering unit 23, and information about a processing target image area output from the detection target area identification unit 25. The object area detection unit 24A subjects only a processing target image area to the processing described in the first embodiment to perform an object area detection process only for an object, such as a vehicle running in front.

As described above, the object detection system 2000 performs an object detection process (contour estimate process) efficiently for an input image that is for example an image capturing a vehicle running in front, in which the target for detection may for example be the vehicle.

Third Embodiment

A third embodiment will now be described.

Figure 19:
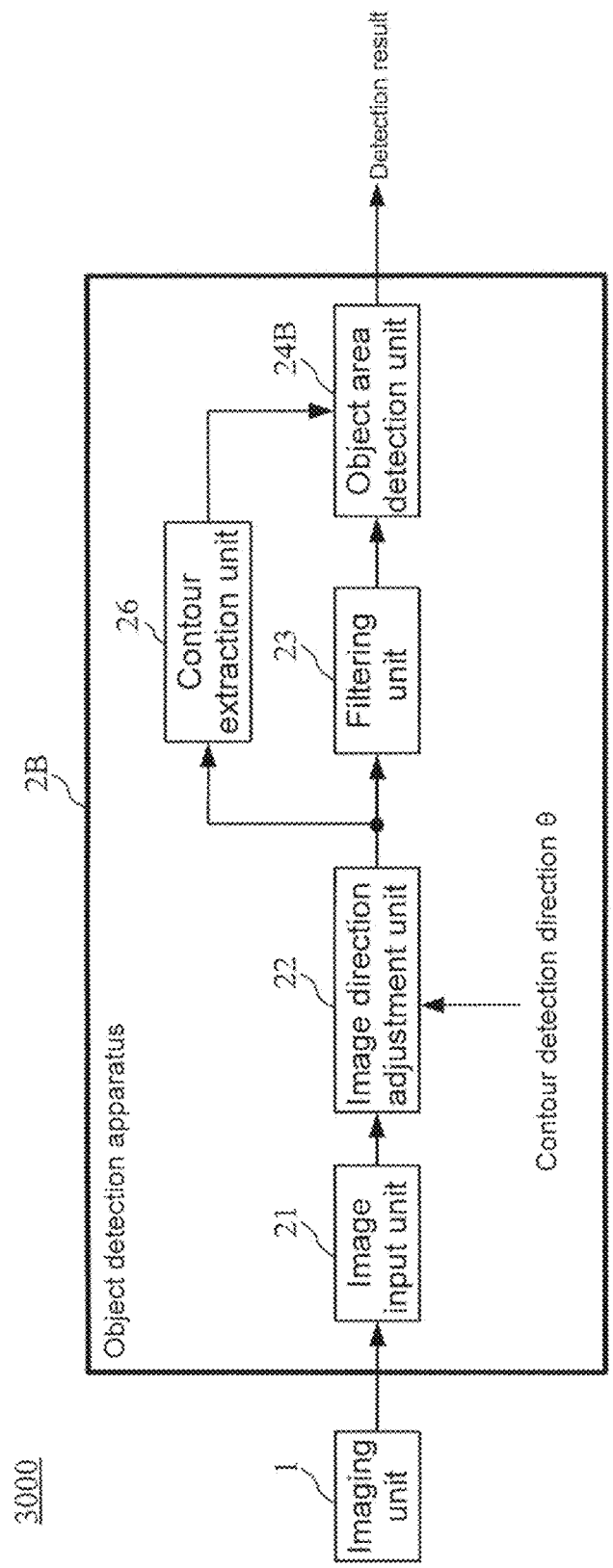
FIG. 19 shows the schematic structure of an object detection system 3000 according to a third embodiment.

FIG. 19 shows the schematic structure of an object detection system 3000 according to a third embodiment.

As shown in FIG. 19, the object detection system 3000 of the present embodiment includes an object detection apparatus 2B, which replaces the object detection apparatus 2 in the object detection system 1000 of the first embodiment. More specifically, as shown in FIG. 19, the object detection system 3000 of the present embodiment has the same structure as the object detection system 1000 of the first embodiment except that it additionally includes a contour extraction unit 26 and includes an object area detection unit 24B, which replaces the object area detection unit 24. The components in the present embodiment that are the same as the components described in the above embodiment will be given the same reference numerals as those components and will not be described in detail.

The contour extraction unit 26 receives an image (image signal) output from the image direction adjustment unit 22. The contour extraction unit 26 may perform an edge extraction process, in which edges are extracted by using, for example, a Sobel filter, to obtain an image from which edge components have been extracted (edge component extracted image). The contour extraction unit 26 outputs the obtained edge component extracted image to the object area detection unit 24B. The contour extraction unit 26 may perform the edge extraction process by using a filter for extracting edge components in the horizontal direction (a horizontal direction differentiation filter).

The object area detection unit 24B receives an image output from the filtering unit 23 (image indicating the detected continuity in the horizontal direction), and an edge component extracted image output from the contour extraction unit 26. For image parts in which the contour components can be differentiated clearly, the object area detection unit 24B determines the contour of the object by using the edge component extracted image. For image parts in which the contour components cannot be differentiated clearly, the object area detection unit 24B detects (estimates) the contour of the object by using the image output from the filtering unit 23 (image indicating the detected continuity in the horizontal direction).

As described above, the object detection system 3000 (1) uses the contour detected through a typical edge extraction process (e.g., the processing using a Sobel filter or a differentiation filter in the horizontal direction) for image parts (image areas) in which the contour can be detected with the typical edge extraction process, and (2) detects (estimates) the contour with the processing described in the first embodiment for image parts (image areas) in which the contour cannot be detected with the typical edge extraction process.

This enables the object detection system 3000 to detect (estimate) the contour in any image in an appropriate manner.

Other Embodiments

Part of all of the above embodiments and modifications may be combined to implement an object detection system.

Although the above embodiments describe the case in which the input image is a brightness image, the embodiments should not be limited to this structure. For example, the processing of the above embodiments may be performed by using, for example, specific color information, or for example, specific color component signals in the RGB color space or the YCbCr color space (image including specific color components). The processing may alternatively be performed by using, for example, brightness signals (brightness images) and specific color component signals (color component signals). Alternatively, three-dimensional vectors defined in the RGB color space or in the YCbCr color space may be used to perform basically the same processing as the processing in the above embodiments to detect (estimate) the contour of an object.

The contour detection direction may be set based on an input from the user. When, for example, the object detection apparatus is mounted on a vehicle, the contour detection direction may be automatically set based on the position or the angle of the imaging unit (camera) or other information. For example, when the inclination of the road on which the vehicle is running is detected based on the contour detection direction, which is set as the vertical direction by default, the contour detection direction may be corrected in accordance with the detected inclination of the road. Alternatively, the Hough transform may for example be used to detect a vanishing point on the image, and a direction perpendicular to the road surface (horizontal surface) may be determined based on the relationship between the vanishing point and the direction in which the vehicle is running, and may input the determined direction as a default value of the contour detection direction (direction of default) into the image direction adjustment unit.

In the above embodiments, the processing may be performed by using image directions reverse to the horizontal direction and the vertical direction described above. For example, the image direction adjustment unit 22 may set the angle of rotation of the image based on the directions reverse to the horizontal direction and the vertical direction described in the above embodiments, and may subject the rotated image to the processing described in the above embodiments. More specifically, the image direction adjustment unit 22 may set the angle of rotation of the image in a manner to increase the detection accuracy of the processing performed by the object detection apparatus in accordance with the properties of a target to be detected (e.g., the shape or characteristics of the detection target), and may subject the rotated image to the processing described in the above embodiments.

Some or all of the components of the object detection system and the object detection apparatus of the above embodiments may be formed using an integrated circuit (e.g., LSI or a system LSI).

All or part of the processes performed by the functional blocks described in the above embodiments may be implemented using programs. All or part of the processes performed by the functional blocks described in the above embodiments may be implemented by a central processing unit (CPU) in a computer. The programs for these processes may be stored in a storage device, such as a hard disk or a ROM, and may be executed from the ROM or be read into a RAM and then executed.

The processes described in the above embodiments may be implemented by using either hardware or software (including use of an operating system (OS), middleware, or a predetermined library), or may be implemented using both software and hardware. When the object detection system and the object detection apparatus of the above embodiments are implemented by hardware, the object detection system and the object detection apparatus require timing adjustment for their processes. For ease of explanation, the timing adjustment associated with various signals required in an actual hardware design is not described in detail in the above embodiments.

The processes described in the above embodiments may not be performed in the order specified in the above embodiments. The order in which the processes are performed may be changed without departing from the scope and the spirit of the invention.

The present invention may also include a computer program enabling a computer to implement the method described in the above embodiments and a computer readable recording medium on which such a program is recorded. The computer readable recording medium may be, for example, a flexible disk, a hard disk, a CD-ROM, an MO, a DVD, a DVD-ROM, a DVD-RAM, a large-capacity DVD, a next-generation DVD, or a semiconductor memory.

The computer program may not be recorded on the recording medium but may be transmitted with an electric communication line, a radio or cable communication line, or a network such as the Internet.

The specific structures described in the above embodiments are mere examples of the present invention, and may be changed and modified variously without departing from the scope and the spirit of the invention.

APPENDIXES

The present invention may also be expressed in the following forms.

A first aspect of the present invention provides an object detection apparatus including a first direction contour component extraction unit, a second direction continuity detection unit, and an object area detection unit.

The first direction contour component extraction unit extracts, from an input image, a contour component in a first direction of the image.

The second direction continuity detection unit detects, in a second direction perpendicular to the first direction, a continuity of the contour component extracted by the first direction contour component extraction unit.

The object area detection unit detects a contour of an object in the image based on the continuity of the contour component in the second direction detected by the second direction continuity detection unit.

In this object detection apparatus, the first direction contour component extraction unit detects a contour component in the first direction of the image, and the second direction continuity detection unit detects, in the second direction perpendicular to the first direction, the continuity of a contour component in the first direction (e.g., a pixel with a large amount of edge component). In this object detection apparatus, the object area detection unit detects (estimates) the contour of the object in the image based on the continuity of the contour component in the second direction detected by the second direction continuity detection unit.

Thus, this object detection apparatus can detect (estimate) the contour of an object in an appropriate manner when the object and its background have almost no contrast in the second direction of the image.

The "continuity in the second direction" includes a continuity in a direction with a predetermined angular difference from the second direction.

A second aspect of the invention provides the object detection apparatus of the first aspect of the invention further including a central axis detection unit. The central axis detection unit detects an axis of symmetry of a substantially line-symmetric object included in the image. The axis of symmetry of the object is parallel to the first direction.

The second direction continuity detection unit detects a continuity of the contour component in the second direction based on the axis of symmetry detected by the central axis detection unit.

This object detection apparatus detects the central axis (axis parallel to the first direction, or the axis of symmetry) of an object that is highly symmetric in the second direction perpendicular to the first direction, and performs an objection detection process based on the detected central axis (axis of symmetry). The above processing thus enables the contour of an object to be detected (estimated) in an appropriate manner in an image having a small change in the contrast (brightness difference) in the first direction, for which the contour of an object may otherwise fail to be detected (estimated) in an appropriate manner in the second direction perpendicular to the first direction, and particularly enables the maximum width (maximum width in the second direction) of a highly symmetric object to be detected with high accuracy.

A third aspect of the invention provides the object detection apparatus of the first or second aspect of the invention further including a contour extraction unit. The contour extraction unit extracts a contour component of the image.

The object area detection unit (1) detects, in an image area in which a contour component is extracted by the contour extraction unit, the contour of the object based on the detected contour component, and (2) detects, in an image area in which a contour component is not detected (or is not detectable) by the contour extraction unit, the contour of the object based on a continuity of the contour component in the second direction detected by the second direction continuity detection unit.

The object detection system (1) uses the contour detected through a typical edge extraction process (e.g., the processing using a Sobel filter) for image parts (image areas) in which the contour can be detected with the typical edge extraction process, and (2) detects (estimates) the contour of the object based on the continuity of the contour component in the second direction detected by the second direction continuity detection unit for image parts (image areas) in which the contour cannot be detected with the typical edge extraction process.

This enables the object detection apparatus to detect (estimate) the contour in any image in an appropriate manner.

A fourth aspect of the invention provides the object detection apparatus of one of the first to third aspects of the invention in which the first direction is a vertical direction of the image, and the second direction is a horizontal direction of the image.

In this object detection apparatus, the first direction is the vertical direction of the image (longitudinal direction or Y-axis direction), and the second direction is the horizontal direction of the image (lateral direction or X-axis direction). This simplifies the processing performed by the first direction contour component extraction unit (e.g., a filtering process) or the processing performed by the second direction continuity detection unit.

A fifth aspect of the invention provides the object detection apparatus of the fourth aspect of the invention in which the first direction contour component extraction unit obtains a degree of change in the vertical direction of the image to extract a contour component in the first direction.

This object detection apparatus simply obtains the degree of change in the vertical direction of the image (longitudinal direction or Y-axis direction), and thus can extract the contour component in the first direction with a simple process (e.g., a simple filtering process).

A sixth aspect of the invention provides the object detection apparatus of the fifth aspect of the invention in which the first direction contour component extraction unit obtains an image including the extracted contour component in the first direction of the image by using a value of Dout(x1, y1) or by using a value of Dout(x1, y1) clipped to an upper limit or a lower limit of possible values of Dout(x1, y1) as a pixel value of a pixel at coordinates (x1, y1) of the image. Dout(x1, y1) is calculated using the equations:

$$Fc1(x1,y1) = \mathrm{clip}(F1(x1,y1),d0),$$

$$Fc2(x1,y1) = \mathrm{clip}(F2(x1,y1),d0), \text{ and}$$

$$Dout(x1,y1) = k1 \times (Fc1(x1,y1) + Fc2(x1,y1))$$

where d0 is a constant, k1 is a coefficient, and clip(x,d) is a function written as clip(x, d)=d when x<d, and written as clip(x, d)=x when x≥d (for example Fc1(x1,y1) and Fc2(x1, y1) are 0 or a positive value when d0=0), or Dout(x1, y1) is calculated using the equation:

$$Dout(x1,y1) = \max(k2 \times F1(x1,y1), k2 \times F2(x1,y1)),$$

where max( ) is a function that returns a maximum value among elements, and k2 is a coefficient, and in the equations, F1(x1, y1) is calculated by using a filter operator F1 represented by Formula 3

$$\begin{bmatrix} 1 & 1 & 1 \\ 0 & 0 & 0 \\ -1 & -1 & -1 \end{bmatrix} \quad (3)$$

and F2(x1, y1) is calculated by using a filter operator F2 represented by

Formula 4

$$\begin{bmatrix} -1 & -1 & -1 \\ 0 & 0 & 0 \\ 1 & 1 & 1 \end{bmatrix}. \quad (4)$$

To allow the value of Dout(x1, y1) to fall within a predetermined range (e.g., a range of values that can be expressed by 8-bit data, or specifically 0 to 255), any value outside the predetermined range may be clipped either to the upper limit or to the lower limit. Alternatively, a predetermined offset value may be added to the value of Dout(x1, y1).

This object detection apparatus can obtain the degree of change in the vertical direction of the image (longitudinal direction or Y-axis direction) simply by performing a two-dimensional filter operation as described above. Thus, the object detection apparatus can extract a contour component in the first direction by performing less operation.

A seventh aspect of the invention provides the object detection apparatus of the fifth aspect of the invention in which the first direction contour component extraction unit obtains an image including the extracted contour component in the first direction of the image by using a value of Dout(x1, y1) or by using a value of Dout(x1, y1) clipped to an upper limit or a lower limit of possible values of Dout(x1, y1) as a pixel value of a pixel at coordinates (x1, y1) of the image. Dout(x1, y1) is calculated using the equation:

$$Dout(x1,y1) = k1 \times F1(x1,y1),$$

where k1 is a coefficient, and
F1(x1, y1) is calculated by using a filter operator F1 represented by Formula 5

$$\begin{bmatrix} 1 & 1 & 1 \\ 0 & 0 & 0 \\ -1 & -1 & -1 \end{bmatrix}. \quad (5)$$

To allow the value of Dout(x1, y1) to fall within a predetermined range (e.g., a range of values that can be expressed by 8-bit data, or specifically 0 to 255), any value outside the predetermined range may be clipped either to the upper limit or to the lower limit. Alternatively, a predetermined offset value may be added to the value of Dout(x1, y1).

This object detection apparatus can obtain the degree of change in the vertical direction of the image (longitudinal direction or Y-axis direction) simply by performing a two-dimensional filter operation as described above. Thus, the object detection apparatus can extract a contour component in the first direction by performing less operation. The above filtering operation enables a contour component to be detected in an appropriate manner in an image including a dark lower area. When processing, for example, an image capturing a vehicle running in front, this object detection apparatus can detect a contour component in the first direction in a lower part of the vehicle in an appropriate manner An eighth aspect of the invention provides an object detection method. The method includes a first direction contour component extraction step, a second direction continuity detection step, and an object area detection step.

The first direction contour component extraction step extracts, from an input image, a contour component in a first direction of the image.

The second direction continuity detection step detects, in a second direction perpendicular to the first direction, a continuity of the contour component extracted in the step of extracting the contour component in the first direction.

The object area detection step detects a contour of an object in the image based on the continuity of the contour component in the second direction detected in the step of detecting the continuity in the second direction.

The object detection method has the same advantageous effects as the object detection apparatus of the first aspect of the present invention.

A ninth aspect of the invention provides a non-transitory computer readable storage medium storing a program enabling a computer to implement the object detection method of the eighth aspect of the invention.

The non-transitory computer readable storage medium storing the program enabling a computer to implement the object detection method has the same advantageous effects as the object detection apparatus of the first aspect of the present invention.

A tenth aspect of the invention provides an integrated circuit including a first direction contour component extraction unit, a second direction continuity detection unit, and an object area detection unit.

The first direction contour component extraction unit extracts, from an input image, a contour component in a first direction of the image.

The second direction continuity detection unit detects, in a second direction perpendicular to the first direction, a continuity of the contour component extracted by the first direction contour component extraction unit.

The object area detection unit detects a contour of an object in the image based on the continuity of the contour component in the second direction detected by the second direction continuity detection unit.

The integrated circuit has the same advantageous effects as the object detection apparatus of the first aspect of the present invention.

The invention claimed is:

1. An object detection apparatus, comprising:
a first direction contour component extraction unit configured to extract, from an image, a contour component in a first direction of the image;
a second direction continuity detection unit configured to detect, in a second direction perpendicular to the first direction, a continuity of the contour component extracted by the first direction contour component extraction unit;
an object area detection unit configured to detect a first end point and a second end point of each image area that has been determined to have continuity in the second direction by the second direction continuity detection unit, the first end point being an end point in the second direction and the second end point being another end point in the second direction, and to detect a contour of an object in the image by estimating a contour line of the object in the first direction based on the detected first end point and the detected second end point; and
a central axis detection unit configured to detect an axis of symmetry of a substantially line-symmetric object included in the image, the axis of symmetry of the object being parallel to the first direction,
wherein the second direction continuity detection unit detects the continuity of the contour component in the second direction based on the axis of symmetry detected by the central axis detection unit.

2. The object detection apparatus according to claim 1, further comprising:
a contour extraction unit configured to extract the contour component of the image, wherein the object area detection unit
detects, in a first image area in which the contour component is extracted by the contour extraction unit, the contour of the object based on the contour component, and
detects, in a second image area in which the contour component is not detected by the contour extraction unit, the contour of the object based on the continuity of the contour component in the second direction detected by the second direction continuity detection unit.

3. The object detection apparatus according to claim 1, wherein
the first direction is a vertical direction of the image, and
the second direction is a horizontal direction of the image.

4. The object detection apparatus according to claim 3, wherein the first direction contour component extraction unit obtains a degree of change in the vertical direction of the image to extract the contour component in the first direction.

5. The object detection apparatus according to claim 4, wherein
the first direction contour component extraction unit obtains an output image including the extracted contour component in the first direction of the image by using a value of Dout(x1, y1) or by using a value of Dout(x1, y1) clipped to an upper limit or a lower limit of possible values of Dout(x1, y1) as a pixel value of a pixel at coordinates (x1, y1) of the image, and
Dout(x1, y1) is calculated using equations:

$$Fc1(x1,y1)=\mathrm{clip}(F1(x1,y1),d0),$$

$$Fc2(x1,y1)=\mathrm{clip}(F2(x1,y1),d0), \text{ and}$$

$$Dout(x1,y1)=k1\times(Fc1(x1,y1)+Fc2(x1,y1))$$

where d0 is a constant, k1 is a coefficient, and clip(x,d) is a function written as clip(x, d)=d when x<d, and written as clip(x, d)=x when x≥d, or Dout(x1, y1) is calculated using another equation:

$$Dout(x1,y1)=\max(k2\times F1(x1,y1),k2\times F2(x1,y1)),$$

where max( ) is a function that returns a maximum value among elements, and k2 is a coefficient, and
in the equations and the another equation, F1(x1, y1) is calculated by using a filter operator F1 represented by $$\begin{bmatrix} 1 & 1 & 1 \\ 0 & 0 & 0 \\ -1 & -1 & -1 \end{bmatrix} \quad (c16\text{-}1)$$

and F2(x1, y1) is calculated by using a filter operator F2 represented by $$\begin{bmatrix} -1 & -1 & -1 \\ 0 & 0 & 0 \\ 1 & 1 & 1 \end{bmatrix}. \quad (c16\text{-}2)$$

6. The object detection apparatus according to claim 4, wherein
the first direction contour component extraction unit obtains an output image including the extracted contour component in the first direction of the image by using a value of Dout(x1, y1) or by using a value of Dout(x1, y1) clipped to an upper limit or a lower limit of possible values of Dout(x1, y1) as a pixel value of a pixel at coordinates (x1, y1) of the image, and
Dout(x1, y1) is calculated using an equation:

$$Dout(x1,y1)=k1 \times F1(x1,y1),$$

where k1 is a coefficient, and
F1(x1, y1) is calculated by using a filter operator F1 represented by $$\begin{bmatrix} 1 & 1 & 1 \\ 0 & 0 & 0 \\ -1 & -1 & -1 \end{bmatrix}.$$ (cl 7)

7. An object detection method comprising:
extracting, from an image, a contour component in a first direction of the image;
detecting, in a second direction perpendicular to the first direction, a continuity of the extracted contour component;
detecting a first end point and a second end point of each image area that has been determined to have continuity in the second direction, the first end point being an end point in the second direction and the second end point being another end point in the second direction;
detecting a contour of an object in the image by estimating a contour line of the object in the first direction based on the detected first end point and the detected second end point;
detecting an axis of symmetry of a substantially line-symmetric object included in the image, the axis of symmetry of the object being parallel to the first direction; and
detecting the continuity of the contour component in the second direction based on the detected axis of symmetry.

8. A non-transitory computer readable storage medium storing a program enabling a computer to implement the object detection method according to claim 7.

9. A system comprising:
a first direction contour component extraction unit configured to extract, from an image, a contour component in a first direction of the image;
a second direction continuity detection unit configured to detect, in a second direction perpendicular to the first direction, a continuity of the contour component extracted by the first direction contour component extraction unit;
an object area detection unit configured to detect a first end point and a second end point of each image area that has been determined to have continuity in the second direction by the second direction continuity detection unit, the first end point being an end point in the second direction and the second end point being another end point in the second direction, and to detect a contour of an object in the image by estimating a contour line of the object in the first direction based on the detected first end point and the detected second end point; and
a central axis detection unit configured to detect an axis of symmetry of a substantially line-symmetric object included in the image, the axis of symmetry of the object being parallel to the first direction,
wherein the second direction continuity detection unit detects the continuity of the contour component in the second direction based on the axis of symmetry detected by the central axis detection unit.

10. The object detection apparatus according to claim 1, wherein the object area detection unit is configured to determine coordinates of a first image area, from said each image area, having a longest continuity of the contour component in the second direction, and to determine other coordinates of a second image area, from said each image area, having a second longest continuity of the contour component in the second direction.

11. The object detection apparatus according to claim 10, wherein the object area detection unit is configured to estimate the contour line of the object in the first direction by connecting the coordinates and the other coordinates corresponding to the longest continuity of the contour component and the second longest continuity of the contour component, respectively.

12. The object detection apparatus according to claim 1, wherein the image is a brightness image.

\* \* \* \* \*